(12) United States Patent
Shimamura

(10) Patent No.: US 7,176,961 B2
(45) Date of Patent: Feb. 13, 2007

(54) PORTABLE ELECTRONIC DEVICE AND PORTABLE CELLULAR PHONE

(75) Inventor: Masaki Shimamura, Tokyo (JP)

(73) Assignee: NEC Corporation, Tokyo (JP)

( * ) Notice: Subject to any disclaimer, the term of this patent is extended or adjusted under 35 U.S.C. 154(b) by 763 days.

(21) Appl. No.: 10/329,526

(22) Filed: Dec. 27, 2002

(65) Prior Publication Data

US 2003/0125080 A1    Jul. 3, 2003

(30) Foreign Application Priority Data

Dec. 28, 2001    (JP) ............................. 2001-401963

(51) Int. Cl.
- H04N 5/225 (2006.01)
- H04N 5/222 (2006.01)
- G03B 13/02 (2006.01)
- H04M 1/00 (2006.01)

(52) U.S. Cl. ............ 348/207.99; 348/376; 348/333.01; 348/341; 348/14.01; 396/376; 455/550.1

(58) Field of Classification Search ................. 396/376
See application file for complete search history.

(56) References Cited

U.S. PATENT DOCUMENTS 4,490,029 A    12/1984    Tanaka et al.
4,560,261 A *  12/1985    Ueda et al. .................. 396/376

(Continued)

FOREIGN PATENT DOCUMENTS

| | | |
|---|---|---|
| JP | 58-223135 | 12/1983 |
| JP | 6-266015 | 9/1994 |
| JP | 10-268308 | 10/1998 |
| JP | 11-142819 | 5/1999 |

(Continued)

OTHER PUBLICATIONS

English Translation of the Chinese Office Action dated Jan. 16, 2004.

(Continued)

*Primary Examiner*—David Ometz
*Assistant Examiner*—Nhan Tran
(74) *Attorney, Agent, or Firm*—McGinn IP Law Group, PLLC

(57) ABSTRACT

A portable electronic device is provided which an operator (photographer) has not an abnormal but favorable feeling from a design (aesthetic) viewpoint and which enables the operator to know an area in which a photograph can be successfully taken or a position of a subject to be photographed. A control section has an auxiliary display section display present time, notification of arrival of data and/or messages, or a like when no photograph is taken. When the operator presses down a photographing mode selecting key, the control section controls a liquid crystal panel so that its all pixels are put into a light transmitting state and causes reflected light from a mirror reflecting plate to be visually viewed by the operator. That is, the auxiliary display section operates as the mirror to look therein at an image of a subject to be photographed. The operator, if wishing to take a photograph of himself/herself, holds a portable cellular phone and directs a camera lens toward himself/herself, and corrects a posture of the portable cellular phone so that his/her face may be looked in such a manner that has a desired size or a desired position in the auxiliary display section operating as the mirror. After the operator has determined photographic composition of the subject, the operator presses down the shutter button.

29 Claims, 20 Drawing Sheets

U.S. PATENT DOCUMENTS

| | | | |
|---|---|---|---|
| 6,466,202 B1 * | 10/2002 | Suso et al. | 455/556 |
| 6,496,657 B2 * | 12/2002 | Aizawa et al. | 396/376 |
| 6,510,325 B1 * | 1/2003 | Mack et al. | 348/14.02 |
| 6,965,413 B2 * | 11/2005 | Wada | 348/376 |
| 7,020,493 B2 * | 3/2006 | Ohmura et al. | 348/14.02 |
| 2004/0100598 A1 * | 5/2004 | Adachi et al. | 349/113 |
| 2005/0157174 A1 * | 7/2005 | Kitamura et al. | 348/207.99 |

FOREIGN PATENT DOCUMENTS

| | | |
|---|---|---|
| JP | 2000-89219 | 3/2000 |
| JP | 2000-171873 | 6/2000 |
| JP | 2000-295323 | 10/2000 |
| JP | 2000-299719 | 10/2000 |
| JP | 2001-136247 | 5/2001 |

OTHER PUBLICATIONS

Japanese Office Action dated Nov. 7, 2006 with partial English translation.

* cited by examiner

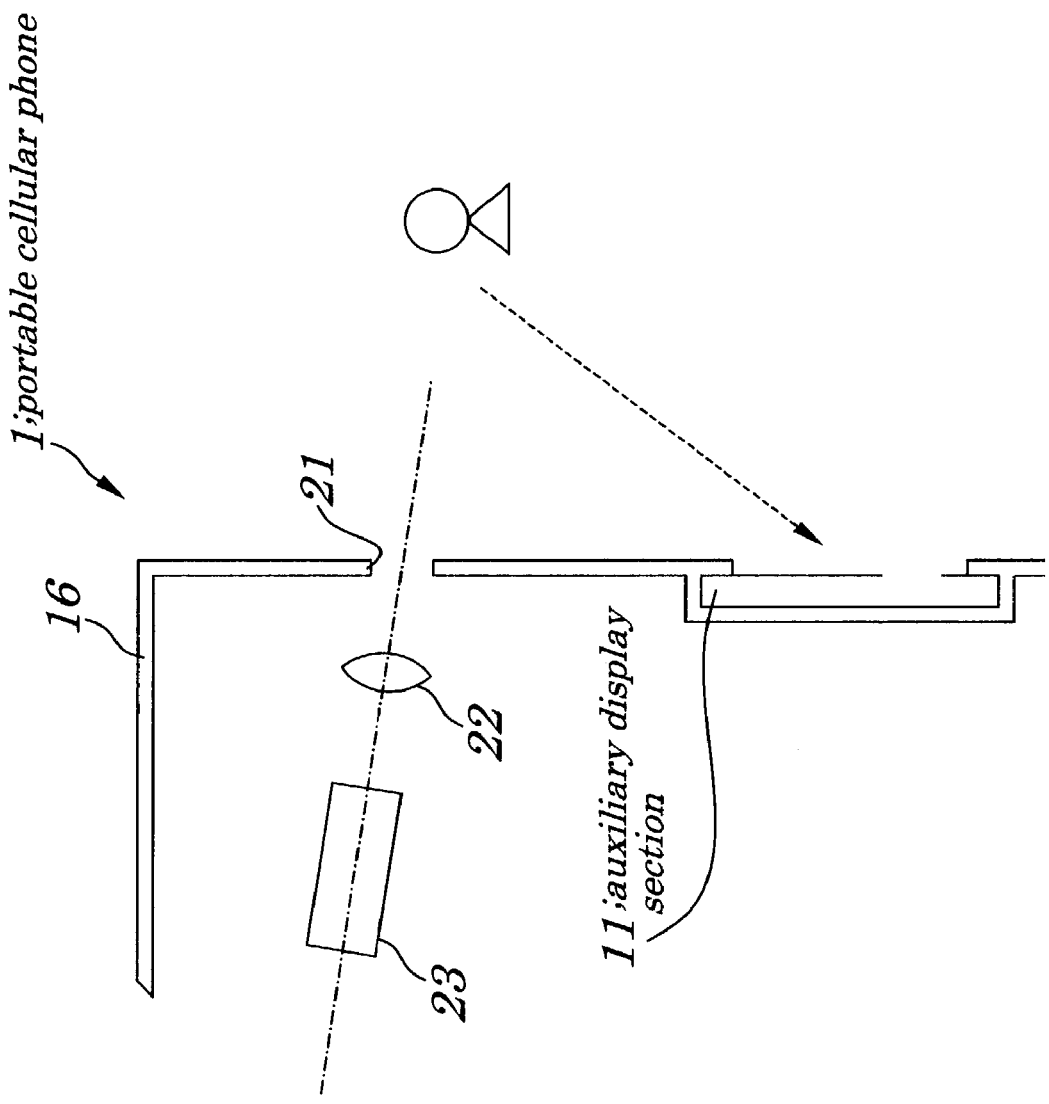

37; specular section
38; specular reflecting plate
39; light-controlling film

39; light-controlling film 40d, 40a, 40c, 40b, 40e 92
93; camera lens
91; auxiliary display section 101; portable cellular phone
103
104
102

PORTABLE ELECTRONIC DEVICE AND PORTABLE CELLULAR PHONE

BACKGROUND OF THE INVENTION

1. Field of the Invention

The present invention relates to a portable electronic device and a portable cellular phone having a photographing function and more particularly to the portable electronic device and the portable cellular phone being equipped with, for example, an electronic still camera, which is preferably used when an operator (photographer) takes a picture of himself/herself.

The present application claims priority of Japanese Patent Application No. 2001-401963 filed on Dec. 28, 2001, which is hereby incorporated by reference.

2. Description of the Related Art

Recently, a portable electronic device such as a portable cellular phone has not only its original function of providing for a telephone conversation (voice communication) but also a function of carrying out data communications. That is, such the portable electronic device is provided with a browser and/or a mailer which enable an access to a homepage through the Internet to send or receive E-mail, thus allowing a user to enjoy, with ease, Internet connection service and/or E-mail service, irrespective of time and/or a place.

Moreover, in recent years, such the portable cellular phone being equipped with an electronic still camera as is disclosed, for example, in Japanese Patent Application Laid-open No. 2000-295323 is generally and widely used. In such the disclosed portable cellular phone, a sender can send E-mail to which a face of the sender and/or a landscape surrounding the sender are attached as image data and a receiver can confirm an appearance of the sender from the attached image data on a display of a portable cellular phone.

The portable cellular phone having the function of taking a photograph such as a folding portable cellular phone 101, as shown in FIG. 24, is provided with a small-sized mirror portion 104 placed just beside a lens window 103 of an electronic still camera mounted on a side of a rear surface of a housing 102 to check a photographing position to be fixed when an operator takes a picture of himself/herself. The operator, when taking a picture of himself/herself, has the portable cellular phone 101 be positioned so that an image of the operator is looked in the mirror portion 104 and checks to see, while observing an image of the operator appearing on the mirror portion 104, that the image of the operator does not deviate from an area in which a photograph can be successfully taken.

However, the conventional folding portable cellular phone 101 has a problem in that a concave and convex shape of the above mirror portion 104 provides an abnormal feeling from a design viewpoint and the mirror portion 104 becomes readily conspicuous due to specular reflection and, when not being used as a mirror, in particular, is not favorable from an aesthetic viewpoint. Moreover, the conventional folding portable cellular phone 101 presents another problem in that, since its mirror portion 104 is placed, from the aesthetic viewpoint, only in a limited small area on the rear face of the folding portable cellular phone 101 so as not to be conspicuous, it is difficult to exactly check on the range in which a clear photograph can be taken and it is impossible to reliably take a photograph of a desired subject all the time.

SUMMARY OF THE INVENTION

In view of the above, it is an object of the present invention to provide a portable electronic device and a portable cellular phone which can give an operator (photographer) not an abnormal but favorable feeling from a design (aesthetic) viewpoint and which enables the operator to know an area in which a photograph can be successfully taken or a position of a subject to be photographed when a picture is taken and can prevent the operator from failing in photographing.

According to a first aspect of the present invention, there is provided a portable electronic device including:

a camera to take a photograph of a subject to be photographed;

a composition determining mirror to look therein at the subject to be photographed, hereby determining photographic composition of the subject to be photographed; and wherein the composition determining mirror is selectively kept in either of a specular state or a non-specular state by an electro-optically controlled switching process.

In the foregoing, a preferable mode is one wherein the composition determining mirror has a mirror reflector so configured as to alternatively appear or hide by being electro-optically controlled.

Also, a preferable mode is one wherein on a front of the mirror reflector is provided a light-controlling layer which is put into a transparent state in which incident light is allowed to pass by being controlled electro-optically or into a light-intercepting state in which the incident light is intercepted by being absorbed or scattered.

Also, a preferable mode is one wherein on the front of the mirror reflector is provided a light-controlling layer, light transmittance of which is controlled in accordance with an applied voltage.

Also, a preferable mode is one wherein the light-controlling layer is constructed so that micro-capsules in which liquid crystals are put hermetically are dispersed in base materials.

Also, a preferable mode is one wherein the composition determining mirror is placed on a same side as a lens window on which incident light fed from the subject to be photographed is incident and is used when a photograph of a photographer himself/herself or a subject to be photographed existing behind the photographer is taken.

Also, a preferable mode is one that where in includes a display unit which is able to display characters and/or images and has the mirror reflector and serves as the composition determining mirror as needed and a control unit which controls the display unit to put a part of or all of regions of the mirror reflector into an appearance state mainly while a photograph is being taken.

Also, a preferable mode is one wherein the display unit is made up of the mirror reflector arranged on a rear of a liquid crystal panel having a plurality of pixels (picture elements) and wherein the control unit puts the pixels in a part of or all of regions of the display unit into a light-transmitting state and a part of or all of regions of the mirror reflector into an appearance state mainly while the photograph is being taken, and has the display unit display characters and/or images mainly while the photograph is not being taken.

Also, a preferable mode is one wherein the light-controlling layer is placed between the liquid crystal panel and the mirror reflector and wherein the control unit puts the light-controlling layer into a light transmitting state mainly while the photograph is being taken and the light-controlling layer into a light-intercepting state mainly while the photograph is not being taken.

Also, a preferable mode is one wherein a surface illuminating device is placed on a front of the liquid crystal panel.

Also, a preferable mode is one wherein the control unit puts a part of or all of regions of the mirror reflector into an appearance state so that only an area (part) of the subject to be photographed may be determined by the photographer.

Also, a preferable mode is one wherein the control unit sets a region of the mirror reflector which is put into the appearance state depending on types of camera lens.

Also, a preferable mode is one that wherein includes:

a display unit being provided with a liquid crystal panel having a plurality of pixels being able to display characters and/or images, a semi-transparent mirror (half mirror) layer being placed on a rear of the liquid crystal panel, and a surface illuminating device being placed on a rear of the semi-transparent mirror layer, and serving also as the composition determining mirror as needed; and a control unit to control the display unit so that the pixels in a part of or all of regions of the display unit are put into a light transmitting state mainly while the photograph is being taken and so that characters and/or images are displayed mainly while the photograph is not being taken.

Also, a preferable mode is one that wherein includes a display unit being provided with a liquid crystal panel having a plurality of pixels being able to display characters and/or images, the light-controlling layer being placed on a front of the liquid crystal panel, a semi-transparent mirror layer being placed on a front of the light-controlling layer, and a surface illuminating device being placed on a rear of the liquid crystal panel, and serving also as the composition determining mirror as needed and a control unit to control the display unit so that, mainly while the photograph is being taken, the light-controlling layer is put into a light-intercepting state and so that, mainly while the photograph is not being taken, characters and/or images are displayed and the light-controlling layer is put into a light-transmitting state.

Also, a preferable mode is one that wherein includes a foldable housing made up of an upper housing and a lower housing, both being coupled to each other through a hinge portion.

Also, a preferable mode is one wherein a first display unit being placed on a side serving as an inside of the housing while the housing is being closed in such a folded manner and a second display unit being placed on a side serving as an outside of the housing while the housing is being closed and wherein at least one of the first and second display units serves also as the composition determining mirror as needed.

Also, a preferable mode is one wherein the display unit is placed in a region surrounding the lens window.

Also, a preferable mode is one that wherein includes an opening and closing detecting device to check to see opening and closing states of the housing, wherein the control unit controls the display unit according to a detecting signal fed from the opening and closing detecting unit.

Also, a preferable mode is one wherein the control unit, at least when the housing is changed from its closed state to its opened state, puts the display unit into a specular state.

Furthermore, a preferable mode is one that wherein includes a function of providing for a telephone conversation (voice communication) and a function of providing for data communications.

According to a second aspect of the present invention, there is provided a portable cellular phone providing for voice communications including:

a camera to take a photograph of a subject to be photographed;

a composition determining mirror to look therein at the subject to be photographed, hereby determining photographic composition of the subject to be photographed; and wherein the composition determining mirror is selectively kept in either of a specular state or a non-specular state by an electro-optically controlled switching process.

With the above configurations, the mirror for determining photographic composition of a subject to be photographed is put into the specular state only when needed, and therefore the operator can have not an abnormal feeling but a favorable feeling from an aesthetic viewpoint about the portable electronic device.

With another configuration, since an operator can smoothly decide photographic composition of a subject to be photographed based on an image of the subject to be photographed that has been in an appearance state when a photograph is taken and has been looked in the mirror reflector and can confirm an area for photographing or a position of a subject to be photographed, a failure in photographing can be prevented.

With still another configuration, a display unit serving also as the mirror for determining photographic composition of the subject to be photographed can be operated to function as the mirror only while the photograph is being taken and to function as the normal display device used to display characters or images while the photograph is not being taken.

BRIEF DESCRIPTION OF THE DRAWINGS

The above and other objects, advantages, and features of the present invention will be more apparent from the following description taken in conjunction with the accompanying drawings in which:

FIG. 7 is a diagram explaining operations of the folding portable cellular phone of the first embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
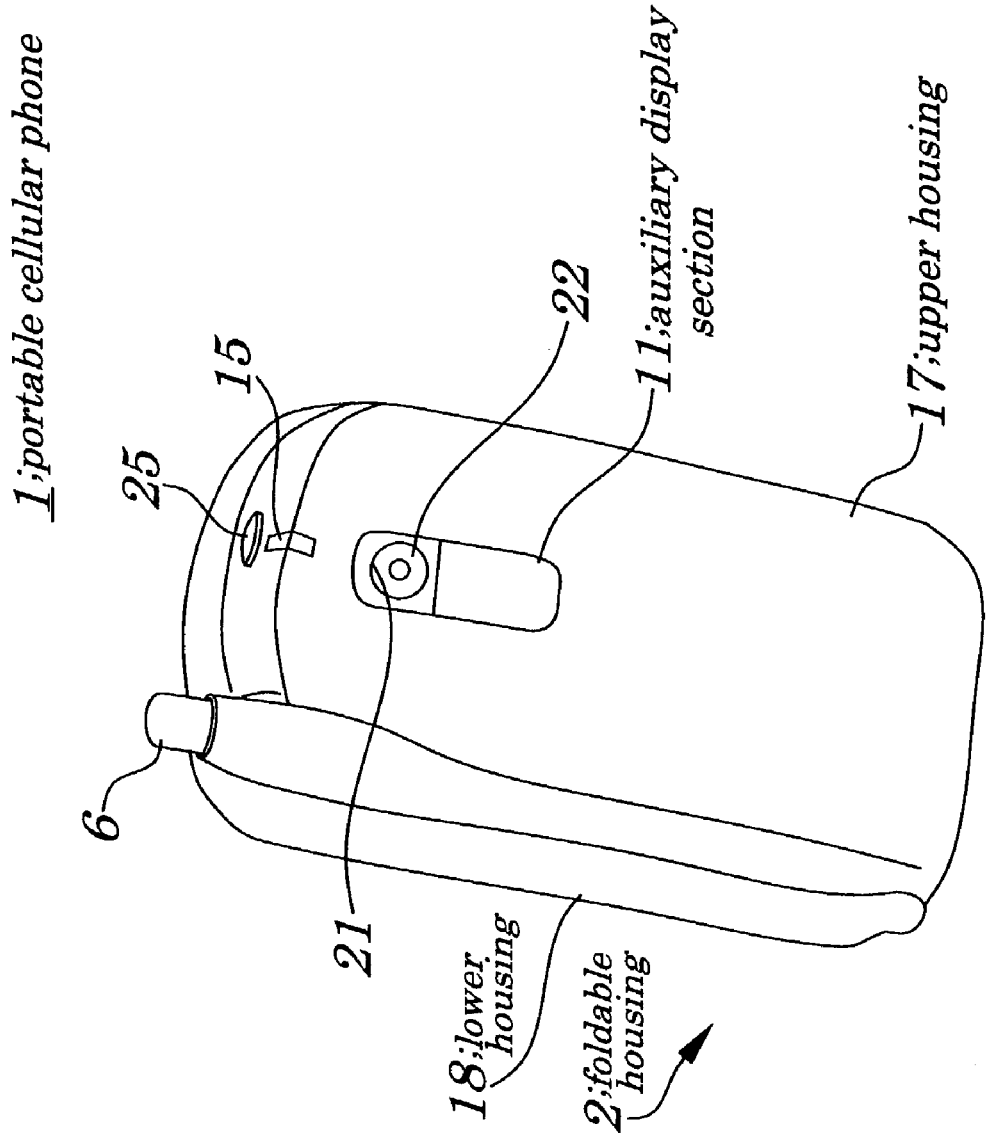
FIG. 1 is a perspective view showing configurations of a folding portable cellular phone and a state in which its housing is closed according to a first embodiment of the present invention.
Figure 2:
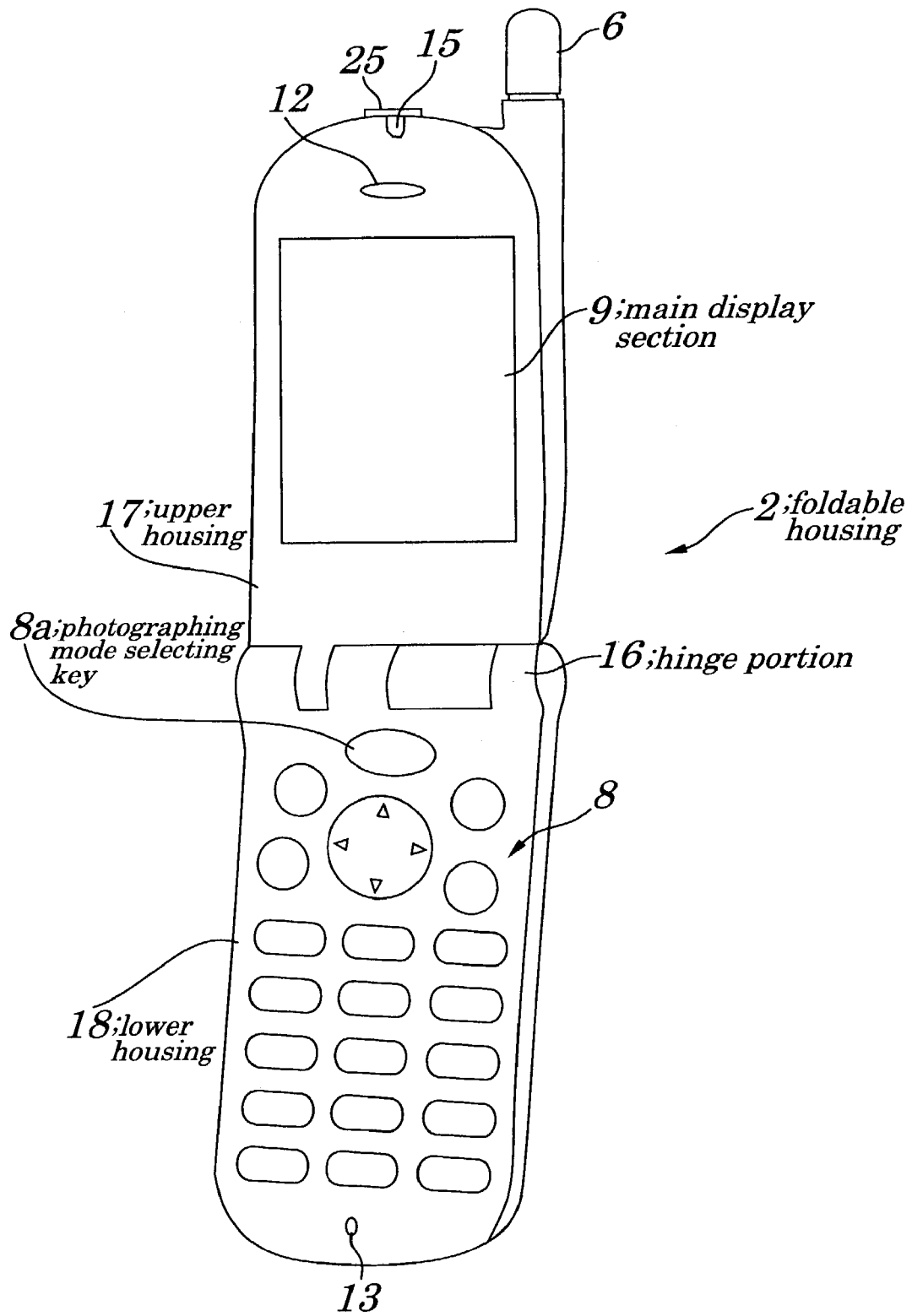
FIG. 2 is a perspective view showing configurations of the folding portable cellular phone and a state in which its housing is opened according to the first embodiment of the present invention.
Figure 3:
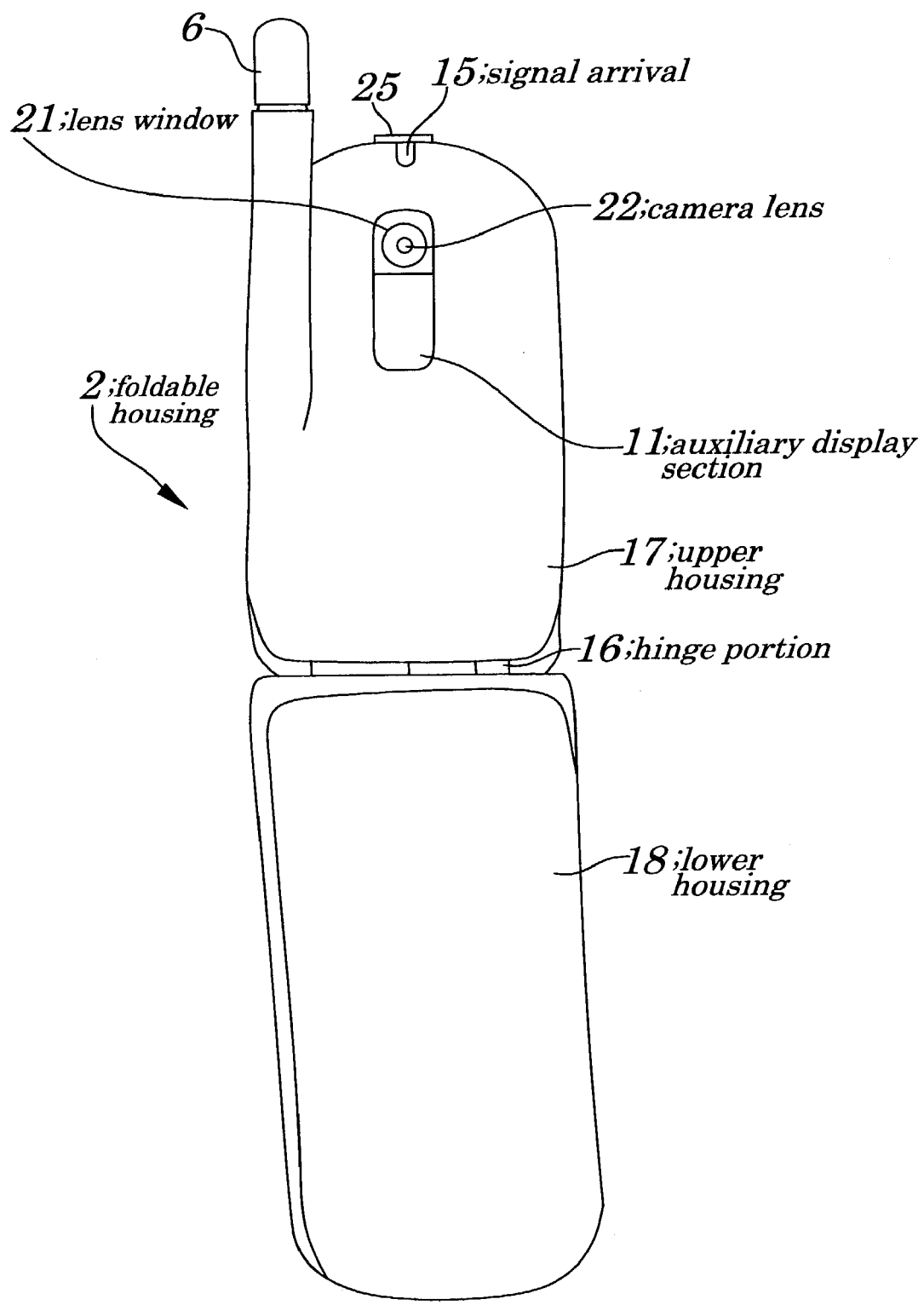
FIG. 3 is a diagram showing configurations of the folding cellular phone and a state in which its housing is opened according to the first embodiment of the present invention.
Figure 4:
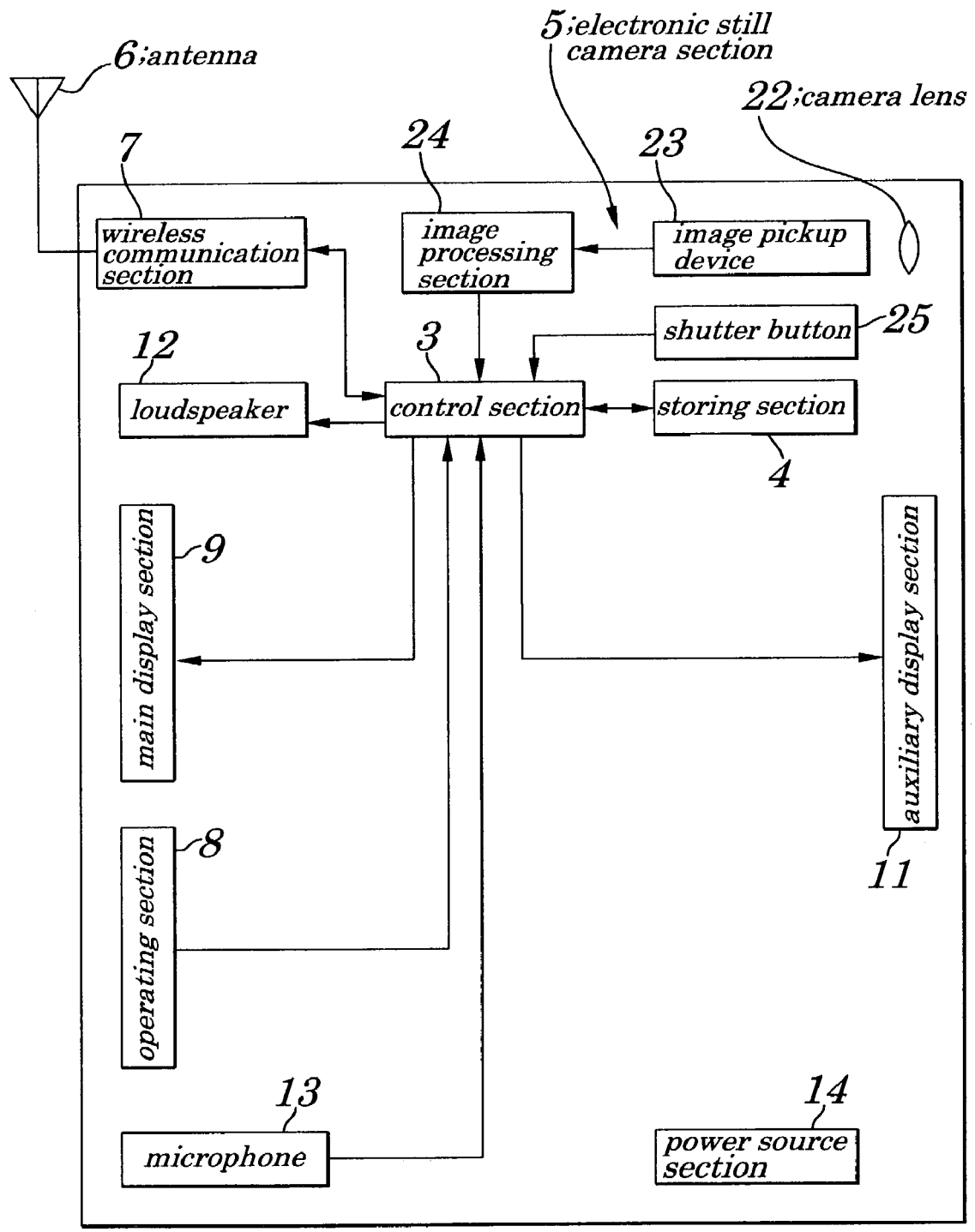
FIG. 4 is a schematic block diagram showing configurations of the folding portable cellular phone of the first embodiment of the present invention.
Figure 5:
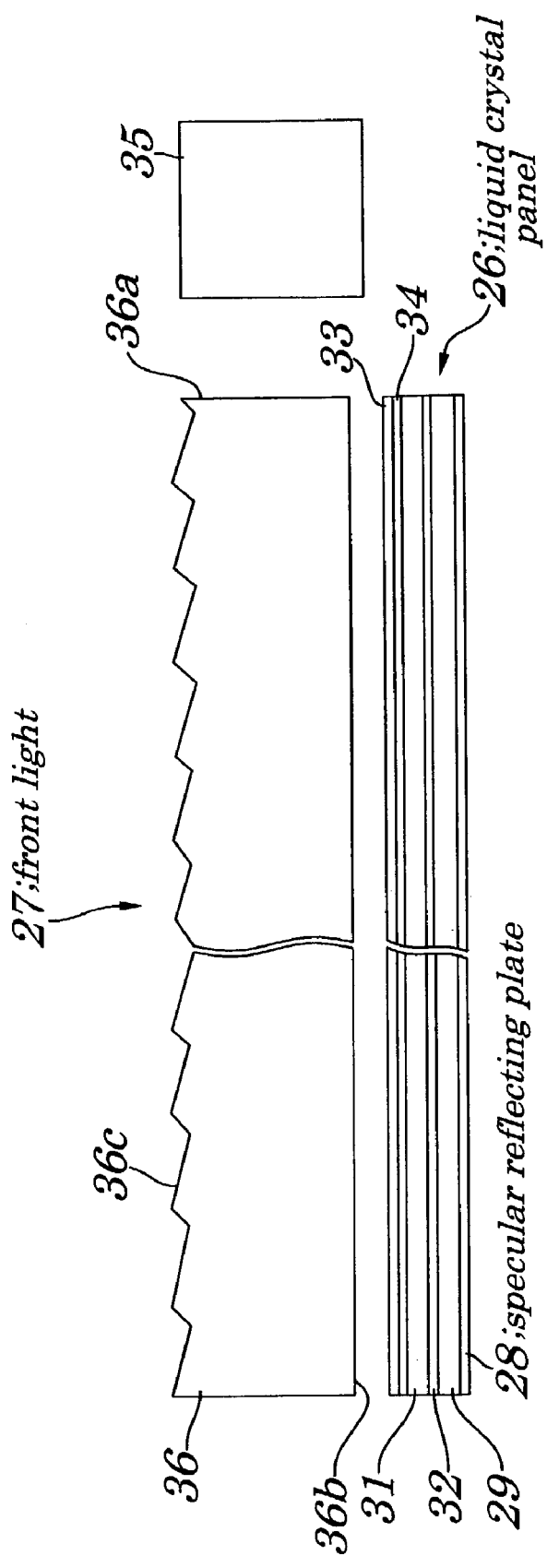
FIG. 5 is a cross-sectional view schematically illustrating configurations of an auxiliary display section of the folding portable cellular phone of the first embodiment of the present invention.
Figure 6:
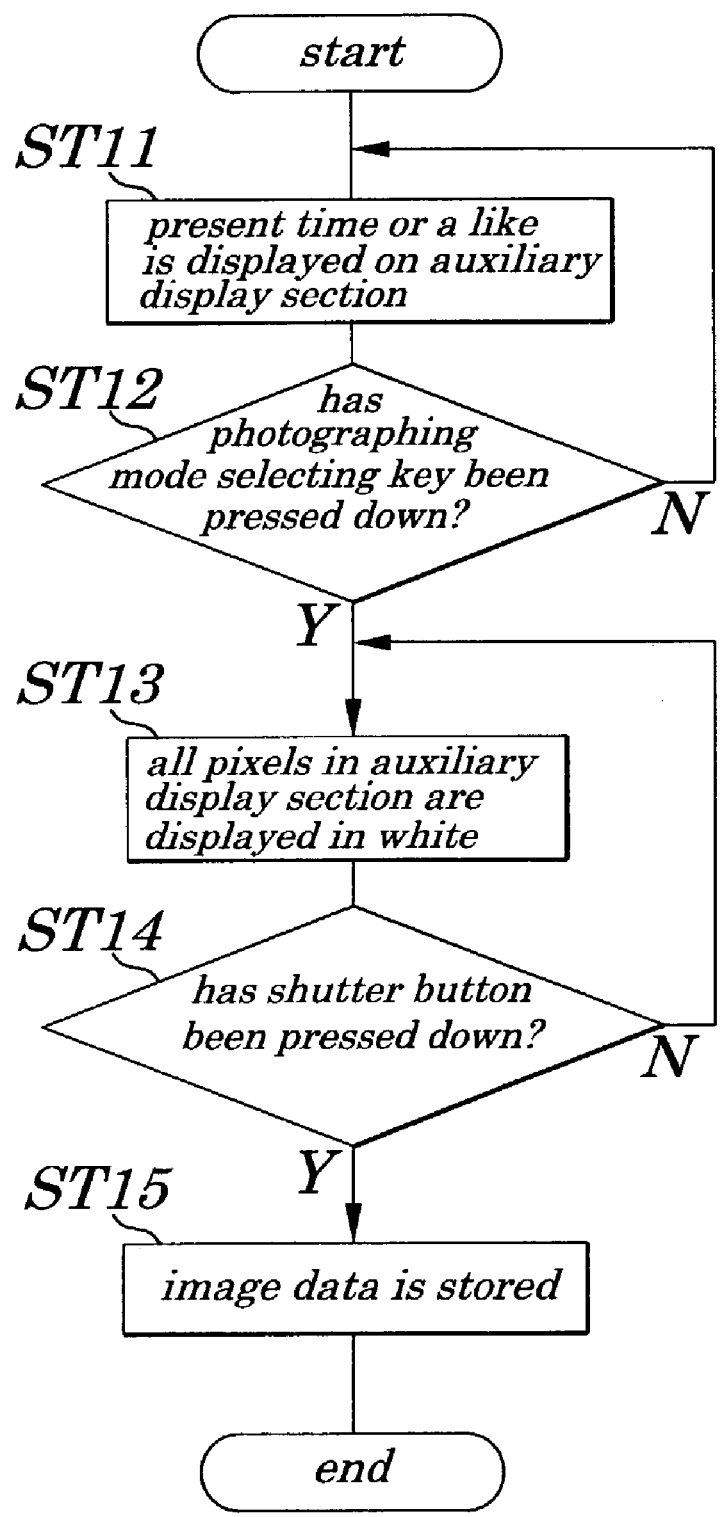
FIG. 6 is a flowchart explaining operations of the folding portable cellular phone of the first embodiment of the present invention.
Figure 8A:
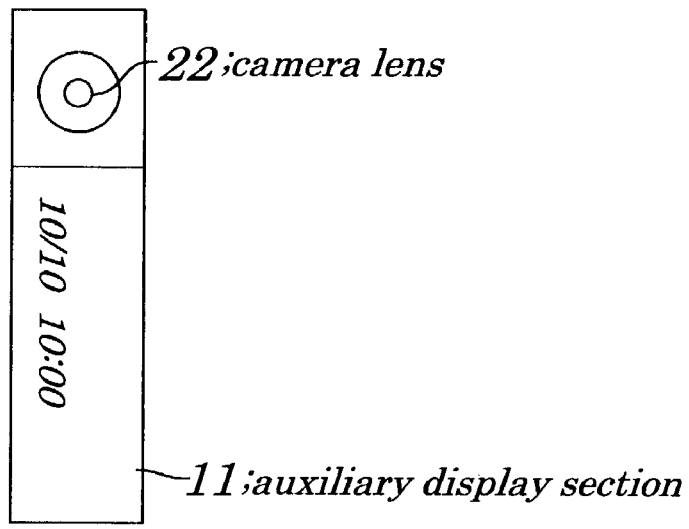
FIG. 8A is a diagram explaining operations of the folding portable cellular phone and showing a state in which its auxiliary display section not operating as a mirror portion and FIG. 8B is a diagram explaining operations of the folding portable cellular phone and showing a state in which its auxiliary display section is operating as the mirror according to the first embodiment of the present invention.
Figure 8B:
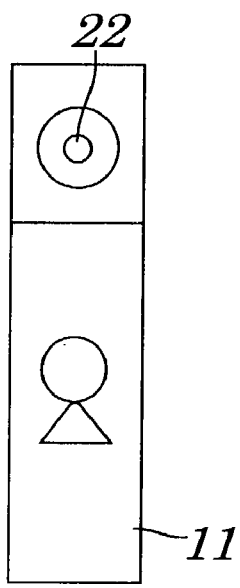

FIG. 1 is a perspective view showing configurations of a folding portable cellular phone and a state in which its housing is closed according to a first embodiment of the present invention. FIG. 2 is a perspective view showing configurations of the folding portable cellular phone and a state in which its housing is opened according to the first embodiment. FIG. 3 is a diagram showing configurations of the folding portable cellular phone and a state in which its housing is opened according to the first embodiment. FIG. 4 is a schematic block diagram showing configurations of the folding portable cellular phone of the first embodiment. FIG. 5 is a cross-sectional view schematically illustrating configurations of an auxiliary display section of the folding portable cellular phone of the first embodiment. FIG. 6 is a flowchart explaining operations of the folding portable cellular phone of the first embodiment of the present invention. FIG. 7 is a diagram explaining operations of the folding portable cellular phone of the first embodiment. FIG. 8A is a diagram explaining operations of the folding portable cellular phone and showing a state in which its auxiliary display section is not operating as a mirror and FIG. 8B is a diagram explaining operations of the folding portable cellular phone and showing a state in which its auxiliary display section is operating as the mirror according to the first embodiment.

The portable cellular phone (portable electronic device) 1 of the first embodiment, as shown in FIG. 1 to FIG. 3, is provided with a foldable housing 2 and has, in addition to its original function of providing for a telephone conversation (voice communication), a function of photographing using an embedded electronic still camera and a function of carrying out data communications in which a homepage can be browsed and/or E-mail can be sent and received by connecting to, for example, the Internet. Moreover, the portable cellular phone 1 of the first embodiment, as shown in FIG. 1 to FIG. 4, is provided with a control section 3 to control each of components of a main body of the portable cellular phone 1, a storing section 4 to store a processing program to be executed by the control section 3 and/or various pieces of data or a like, an electronic still camera section 5 to take a photograph of a person and/or a surrounded landscape, or a like to be sent, an antenna 6 to send and receive wireless radio waves, a wireless communication section 7 to modulate voices and/or data and to send them through the antenna 6 as wireless radio waves, and to receive the wireless radio waves through the antenna 6 and to demodulate them to voices and/or data to have a telephone conversation or carry out data communications according to a specified protocol, an operating section 8 made up of various types of operating keys or a like, a main display section (serving as a first display unit) 9 made up of a liquid crystal display device being placed on a side serving as an inside face when being folded, an auxiliary display section 11 (being used as a mirror for determining photographic composition of a subject to be photographed, as a displaying unit, and as a second display unit) made up of a liquid crystal display, being placed on a side serving as an outside portion when the portable cellular phone 1 is folded, being used as a mirror as needed, and for example being used for determining photographic composition of a subject to be photographed when an operator (photographer) takes a photograph of himself/herself, a loud speaker 12 to output voices, a microphone 13 to receive voices, a power source 14 made up of battery or a like, and a signal arrival notifying lamp 15 to notify, for example, arrival of signals by being lit.

The foldable housing 2 of the first embodiment, as shown in FIG. 3, is made up of an upper housing 17 and a lower housing 18 both being connected to each other through a hinge portion 16. The hinge portion 16 operates to connect the upper housing 17 to the lower housing 18 in a freely rotatable manner, which provides a foldable structure to the portable cellular phone 1.

The control section 3 executes various programs stored in the storing section 4 including a switching control program to switch the auxiliary display section 11 between a case where the auxiliary display section 11 is used for normal display and a case where the auxiliary display section 11 is used as a mirror, a display control program to control the main display section 9, a browser operating as a program to browse a homepage, a mailer operating as a program to create, send, or receive E-mail and controls each of the components and performs processing of management of information by using various registers and/or flags included in the storing section 4.

The storing section 4 is made of semiconductor memories such as a ROM (Read-Only Memory), RAM (Random Access Memory), or a like and stores various programs such as the switching control program, display control program, or a like to be executed by the control section 3 and various kinds of pieces of information including received information, image data obtained through photographing by the electronic still camera section 5 or a like, and is provided with a variety of registers and flags to be used by the control section 3 to run the above programs. The switching control program describes procedures to exert control so that the auxiliary display section 11 can be used as the mirror with all pixels being put into a light transmitting state at a time of being photographed in particular and the auxiliary display section 11 can be used not as the mirror but as a device to display, for example, present time, notification of arrival of data and/or messages, or a like except a time of being photographed in particular.

The electronic still camera section 5 is mounted on a face serving as an outside of the portable cellular phone 1 when the upper housing 17 is folded and has a lens window 21 on which light coming from a subject to be photographed is incident, a camera lens 22 made up of, for example, a wide-angle lens placed in a vicinity of the lens window 21, an image pickup device 23 made up of a CCD (Charge Coupled Device) image pickup device to perform photoelectric conversion on an image formed through the camera lens 22 and to output an image signal as an electric signal, to an image processing section 24 to perform AD (Analog to Digital) conversion on the image signal transmitted from the image pickup device 23 and image processing such as a gamma correction, color-space conversion, or a like on digitized signals, and a shutter button 25 placed on an upper end of the upper housing 17.

Moreover, an optical axis of the camera lens 22 is set so that it is slanted slightly downward relative to a normal of a surface of the auxiliary display section 11 being placed on an outside of the upper housing 17 and so that, when an operator (photographer) takes a photograph of himself/herself, an area in which the operator being a subject to be photographed is looked in the auxiliary display section 11 operating such that a mirror matches an area in which the photograph is taken.

The operating section 8 is placed on a face serving as an inside face of the lower housing 18 when being folded. On the inside face of the lower housing 18 are arranged a photographing mode selecting key 8a to select a photographing mode which enables photographing by the electronic still camera section 5, a mail mode selecting key to create, send, or receive E-mail, a conversation mode selecting key to have a voice telephone conversation, a browser mode selecting key to run a browser for browsing of a home page, a clear key to switch from the photographing mode or a like to a stand-by mode in which a stand-by screen is displayed and a start of operations and arrival of data and/or messages or a like are waited for, a power source key, a ten-key pad to input numerals or a like, a cursor key to move a cursor on a display screen appearing on the main display section 9 in an up-and-down and left-and-right directions, and a like. The main display section 9 is made up of a transparent-type liquid crystal display device being placed on a face serving as a inside face of the upper housing 17 when being folded.

The auxiliary display section 11, as shown in FIG. 5, is placed below the lens window 21 and is made up of a specular reflection—type liquid crystal display whose plane shape is approximately rectangular. The auxiliary display section 11 has a liquid crystal panel 26 constructed of many pixels, a front light (surface illuminating device) 27 placed on a front (that is, on a side facing a viewer of the auxiliary display section 11) of the liquid crystal panel 26, and a specular reflecting plate (specular reflection section) 28 placed on a rear of the liquid crystal panel 26.

The liquid crystal panel 26 is, for example, a TFT (Thin Film transistor)—type panel whose outer shape is rectangular, which, as shown in FIG. 5, has a TFT substrate 29 on which a plurality of TFTs and transparent pixel electrodes are formed, a facing substrate 31 fixed in a manner so as to face the TFT substrate 29 with space of several μm interposed between the facing substrate 31 and the TFT substrate 29, a liquid crystal layer 32 put into the above space in a hermetic manner, a deflector 33 placed on a front face of the facing substrate 31, and a quarter-wave plate 34.

The front light (surface illuminating device) 27 is provided with a belt-shaped light emitting source 35 made up of a fluorescent lamp or a like to emit belt-shaped light and a light-guiding plate 36 made of light-transmitting materials on which light fed from the belt-shaped light emitting source 35a is incident from a side of its light incident end face 36a to apply plane-shaped illuminating light from a plane-shaped light illuminating face 36b toward the liquid crystal panel 26 placed on the rear of the front light (surface illuminating device) 27 and to have reflected light fed from the liquid crystal panel 26 transmit from the light illuminating face 36b toward a side of a prism face 36c on which parallel ridgeline groups each having undergone surface processing so as to provide a prism shape are formed.

In the auxiliary display section 11, at a time of taking a photograph in particular, all pixels making up the liquid crystal panel 26 are put in a light transmitting state and, as a result, reflected light fed from the specular reflecting plate 28 is visually viewed by the operator and an image of a subject to be photographed in a photographing range is looked in an approximately rectangular region and, at a time of not being photographed in particular, for example, present time, notification of arrival of data and/or messages, or a like are displayed. Here, a shape and size of the auxiliary display section 11 when being used as a mirror corresponds to a photographing range in which a subject to be photographed is captured as image data.

Next, operations of the portable cellular phone 1 of the first embodiment are described by referring to FIG. 6 to FIG. 8B. First, after power has been turned ON, the control section 3 is put in a stand-by mode in which a start of inputting operations by the operator and/or notification of arrival of data and/or messages or a like are waited for and gets a stand-by screen displayed on the main display section 9 and, as shown in FIG. 8A, present time, notification of arrival of data and/or messages, or a like displayed on the auxiliary display section 11 (Step ST11, see FIG. 6). In this state, when the operator presses down the photographing mode selecting key 8*a* and selects a photographing mode (Step ST12), operations are changed to be in the photographing mode.

This causes the control section 3 to control so as to put all the pixels making up the liquid crystal panel 26 into a light transmitting state (display in white) (Step ST13) and the operator to visually recognize light reflected off the specular reflecting plate 28. That is, as shown in FIG. 8B, the auxiliary display section 11 operates as the mirror to look at an image of a subject to be photographed in the mirror.

Moreover, the control section 3 has the main display section 9 display a subject to be photographed existing on a front of the camera lens 22 on-screen and displays a message that the main display section 9 is currently in a photographing stand-by state and photographing is made possible by pressing down the shutter button 25.

The operator, if wishing to take a photograph of himself/herself, as shown in FIG. 7, holds the portable cellular phone 1 and directs the camera lens 22 to himself/herself to decide photographic composition of a subject to be photographed while seeing the auxiliary display section 11 being used as the mirror. That is, the operator corrects a posture or a like of the portable cellular phone 1 so that his/her face may be looked in such a manner to have a desired size or a position. After the operator has determined photographic composition of a subject to be photographed and confirmed an area in which photographing is performed, the operator presses down the shutter button 25 (Step ST14). Moreover, at this point, the control section 3 feeds a predetermined voice signal to the microphone 13 to generate a shutter sound.

The control section 3, when having received image data obtained by photographing from the image processing section 24, stores it into the storing section 4 (Step ST15) and has the main display section 9 display an image based on the image data. After that, if the operator wants to send E-mail with a photographed image of himself/herself being attached to, for example, to a friend and performs sending operations by pressing down a mail mode selecting key in the operation section 8 to put operations into a mail mode, the control section 3 sends the image data obtained by photographing, through the wireless communication section 7, to other portable cellular phone designated by the operator.

Thus, according to the portable cellular phone 1 of the first embodiment, since the auxiliary display section 11 can be used as the mirror only when a photograph is taken and as a normal display device to display, for example, present time or a like when a photograph is not taken, the operator (photographer) has not an abnormal feeling but a favorable feeling from a design (aesthetic) viewpoint. Moreover, since the operator can surely determine photographic composition of the subject to be photographed based on the image of a subject to be photographed that has been looked in the auxiliary display section 11 being used as the mirror while the photograph is taken and can confirm an area (parts) to be photographed or a position of a subject to be photographed, it is possible to prevent an unfavorable photograph from being taken. Moreover, the auxiliary display section 11 can be used not only for confirming an area for photographing but also for making himself/herself appearance neat.

Second Embodiment

Figure 9:
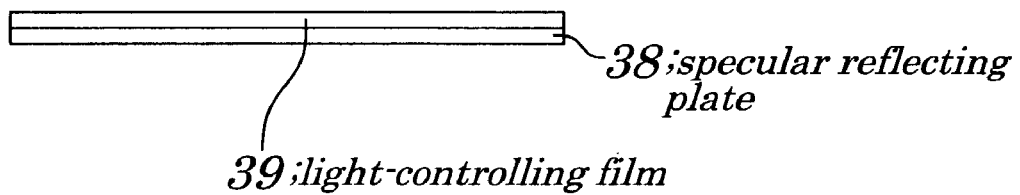
FIG. 9 is a cross-sectional view schematically showing configurations of a mirror portion of a folding portable cellular phone according to a second embodiment of the present invention.
Figure 10:
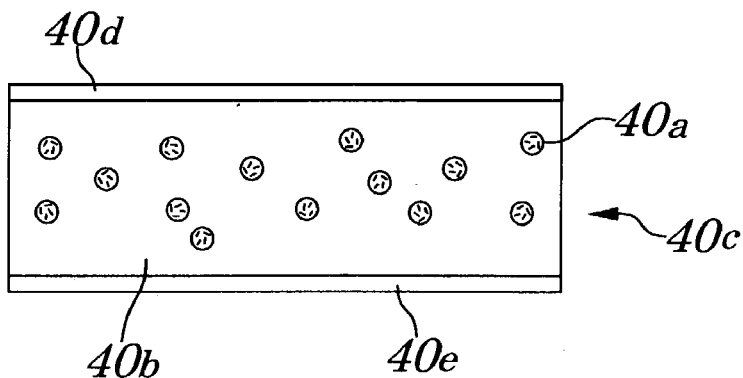
FIG. 10 is a cross-sectional view schematically showing configurations of a light-controlling film in the mirror portion of FIG. 9.
Figure 11:
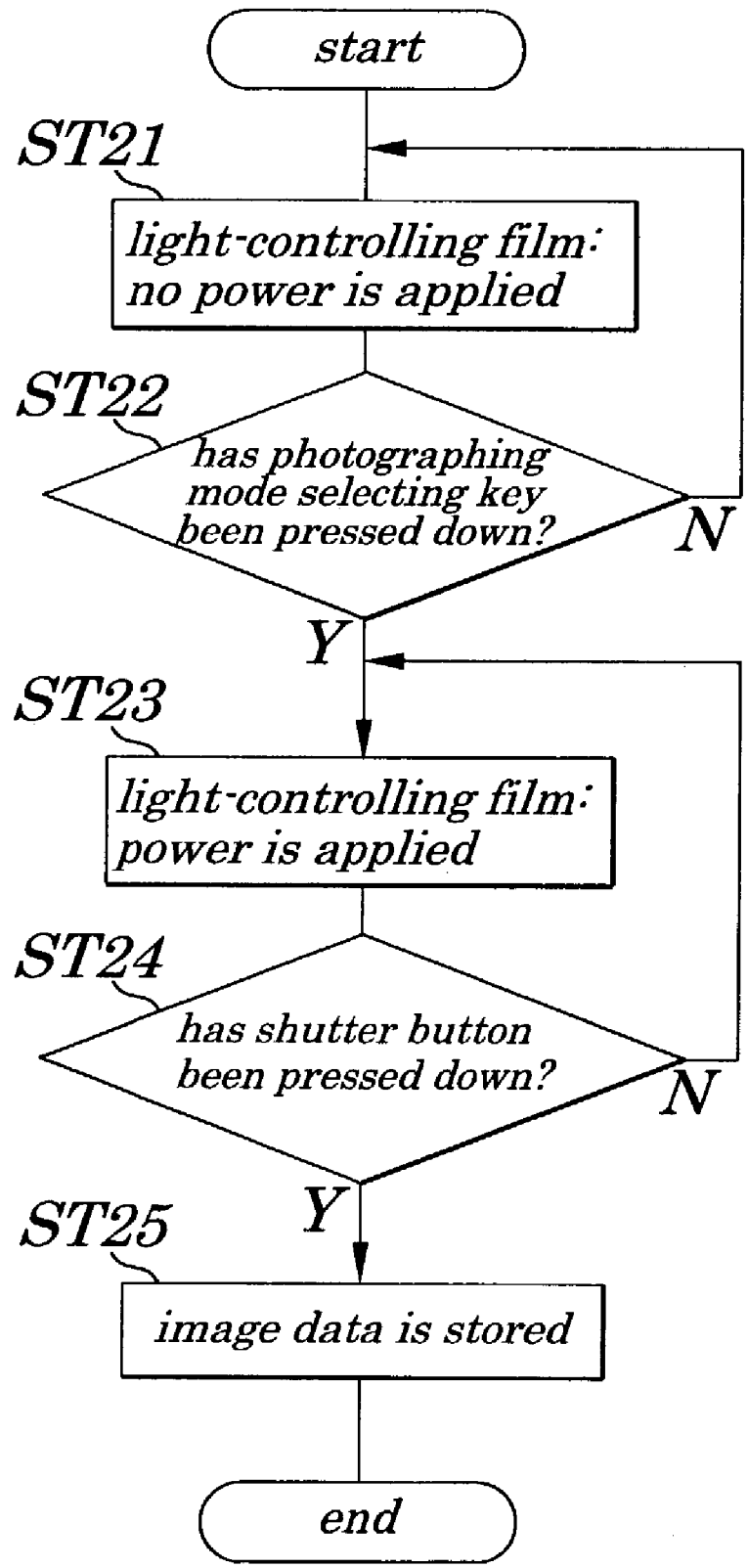
FIG. 11 is a flowchart explaining operations of the portable cellular phone of the second embodiment of the present invention.

FIG. 9 is a cross-sectional view schematically showing configurations of a mirror portion of a folding portable cellular phone according to a second embodiment of the present invention. FIG. 10 is a cross-sectional view schematically showing configurations of a light-controlling film in the mirror portion of FIG. 9. FIG. 11 is a flowchart explaining operations of the portable cellular phone of the second embodiment.

Configurations of the second embodiment differ from those in the first embodiment in that, instead of the auxiliary display section, a mirror portion is provided which has no function of display and is used as a mirror when a photograph is taken. Configurations other than described above are same as those in the first embodiment and their descriptions are simplified accordingly.

A folding portable cellular phone 1 of the second embodiment is provided with a specular section (serving as a mirror for determining photographic composition of a subject to be photographed) 37 which is placed below a lens window 21 and is used as a mirror as necessary, for example, to determine photographic composition of a subject to be photographed when an operator is taking a photograph of himself/herself. The specular section 37, as shown in FIG. 9, has a specular reflecting plate 38 and a light-controlling film (light-controlling layer) 39 being placed on a front of the specular reflecting plate 38, light transmittance of which is controlled according to an applied voltage.

In the specular section 37, the light-controlling film 39 is put into a light-transmitting state and the entire specular section 37 is used as a mirror mainly while a photograph is taken and the light-controlling film 39 is put into a light-intercepted state mainly while no photograph is taken and externally-fed light is scattered. The light-controlling film 39, as shown in FIG. 10, has a liquid crystal layer 40*c* made up of a polymer matrix 40*b* in which micro-capsules (a diameter of each capsule being, for example, 1 μm to 2 μm) each having a liquid crystal hermetically put) 40*a* are dispersed, transparent conductive layers 40*d* and 40*e*, one being placed on one side of the liquid crystal layer 40*c* and an other being placed on an other side of the liquid crystal layer 40*c*.

When no voltage is applied between the transparent conductive layers 40*d* and 40*e*, molecules of the liquid crystal hermetically put into the micro-capsules 40*a* are oriented in an arbitrary direction and light incident on the liquid crystal layer 40*c* is scattered and the liquid crystal layer 40*c* is put into an opaque and whitish state. Moreover, when an alternating current or direct current of, for example, 30 V to 150 V is applied between the transparent conductive layers 40*d* and 40*e*, the liquid crystal molecules hermetically put into the micro-capsules 40*a* are arranged in a direction of an electric field and the liquid crystal layer 40*c* becomes transparent to light. If the applied voltage is lowered, the liquid crystal layer 40*c* is put into a semi-transparent state in which a part of the incident light is scattered.

Next, operations of the portable cellular phone of the second embodiment are described by referring to FIG. 11. First, after power has been turned ON, the control section 3 is put into a stand-by mode to wait for a start of operator's inputting operations or arrival of data and/or messages, or a like and to have the stand-by screen displayed on a main display section 9, and no power is applied to the light-controlling film 39 so that it is put into a light-intercepting state to scatter incident light (Step ST21, see FIG. 11). In this state, when the operator presses down a photographing mode selecting key 8*a* to select a photographing mode (Step ST22), operations are changed to be in the photographing mode.

As a result, the control section 3 applies a predetermined voltage to the light-controlling film 39 to put it into a transparent state (Step ST23) and to have the operator visually recognize light reflected off the specular reflecting plate 38. That is, the specular section 37 is used as a mirror in which an image of a subject to be photographed is looked. In this state, the operator, if wishing to take a photograph of himself/herself, directs a camera lens 22 to himself/herself and holds the portable cellular phone 1 at the ready and corrects a posture of the portable cellular phone 1 so that his/her face may be looked in a manner that has a desired size or a desired position.

After the operator thus determines photographic composition of a subject to be photographed and confirms an area for photographing, the operator presses down a shutter button 25 (Step ST24).

The control section 3, when having received image data obtained by photographing from an image processing section 24, stores the received image data into a storing section 4 (Step ST25) and stops a supply of a voltage to the light-controlling film 39 to put it into a light-intercepting state so that incident light is scattered and then feeds, based on the image data, a predetermined display signal to the main display 9 to display an image. After that, the control section 3, by an operator's transmitting operation, sends image data obtained by photographing through a wireless communication section 7 to an other portable cellular phone, or a like designated by the operator.

According to the portable cellular phone of the second embodiment, since its specular section 37 is used as a mirror only when a photograph is taken and intercepts light and scatters light while the photograph is not taken, the operator (photographer) has not an abnormal feeling but a favorable feeling from a design (aesthetic) viewpoint.

Moreover, since the operator can surely decide photographic composition of a subject to be photographed based on the image of the subject to be photographed that has been looked in the specular section 37 being used as the mirror while the photograph is taken and can confirm an area in which photographing is performed or a position of a subject to be photographed, a failure in photographing can be prevented.

Third Embodiment

Figure 12:
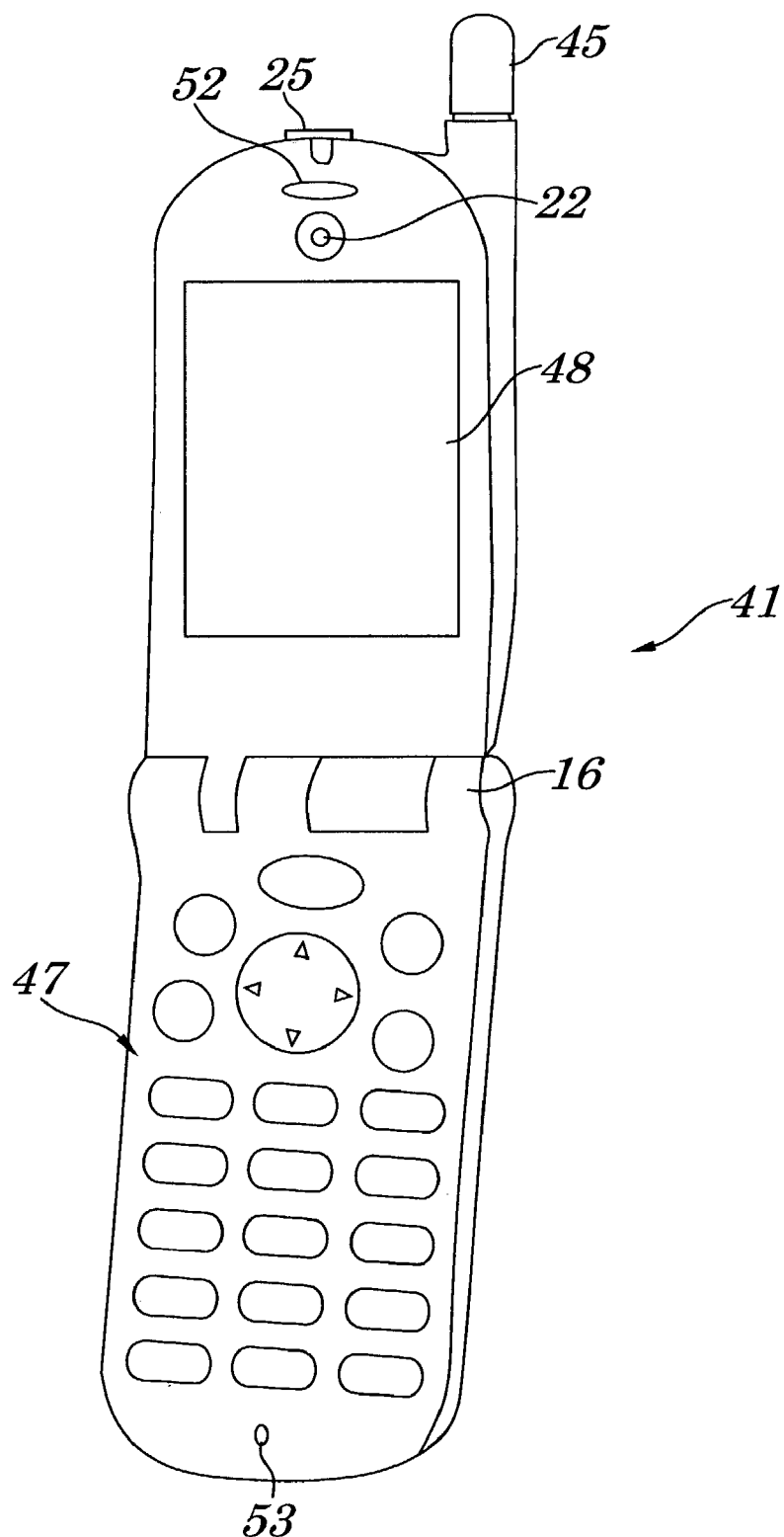
FIG. 12 is a perspective view showing configurations of a folding portable cellular phone according to a third embodiment of the present invention.
Figure 13:
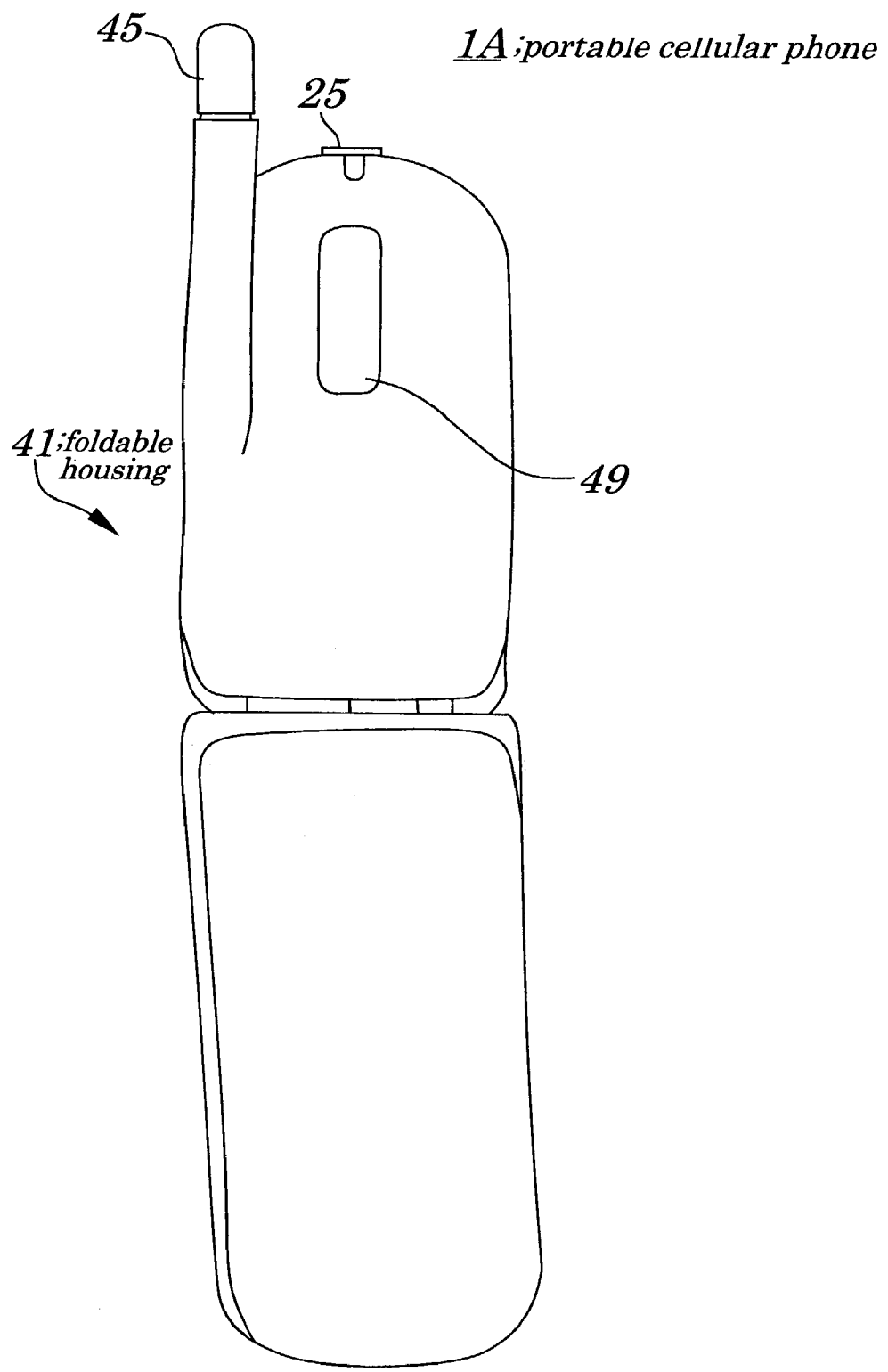
FIG. 13 is a perspective view showing configurations of the folding portable cellular phone according to the third embodiment of the present invention.
Figure 14:
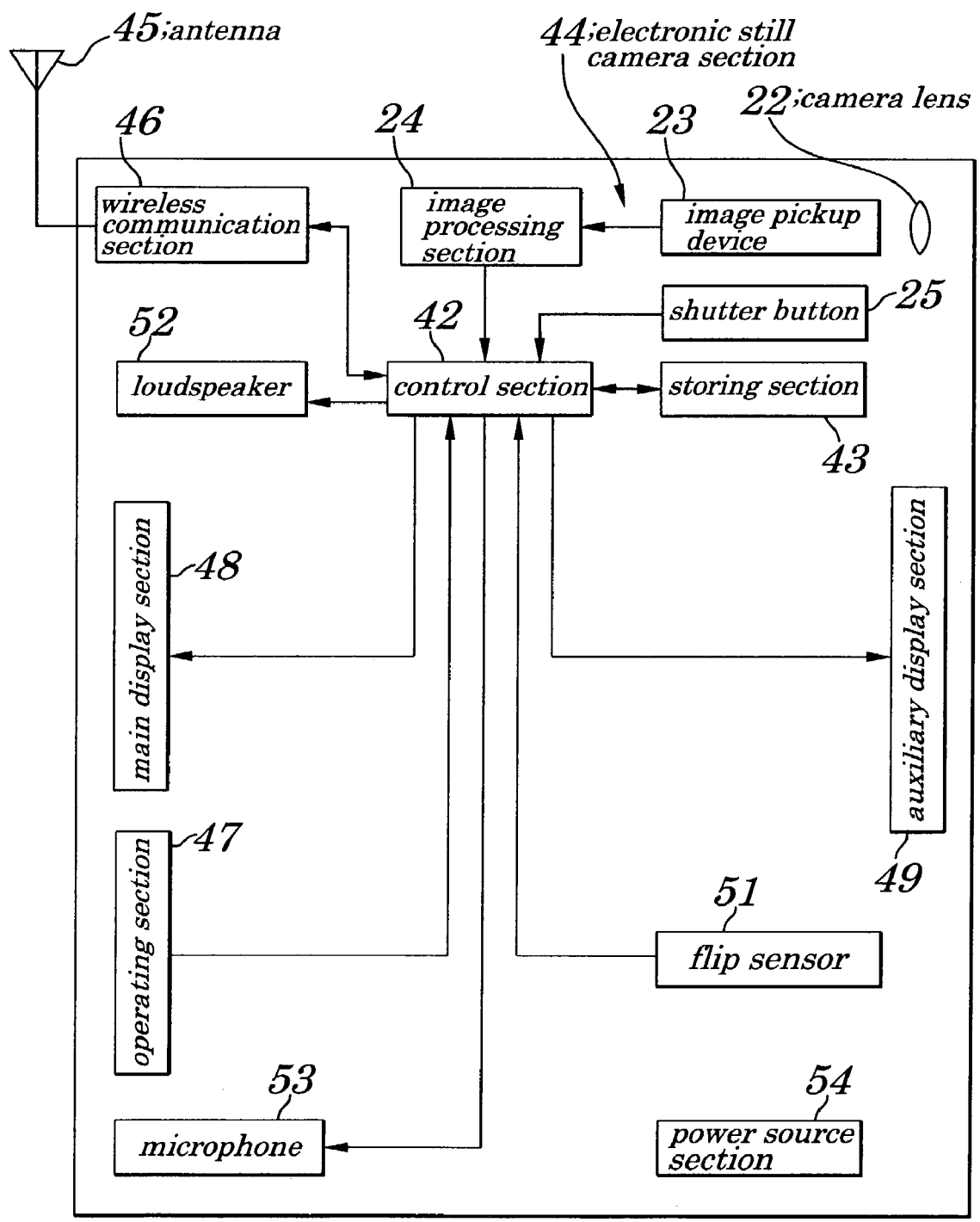
FIG. 14 is a schematic block diagram showing configurations of the folding portable cellular phone according to the third embodiment of the present invention.
Figure 15:
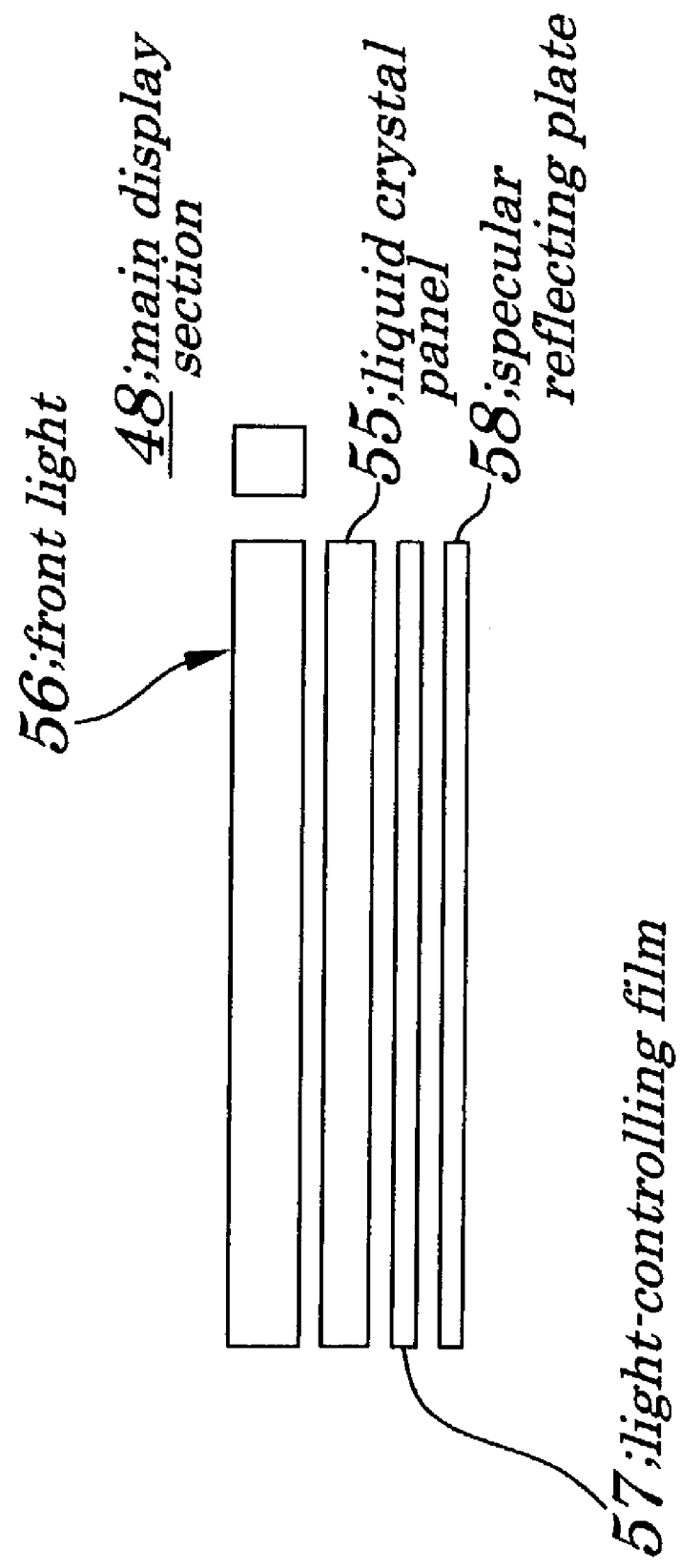
FIG. 15 is a cross-sectional view schematically illustrating configurations of a main display section of the folding portable cellular phone according to the third embodiment of the present invention.
Figure 16:
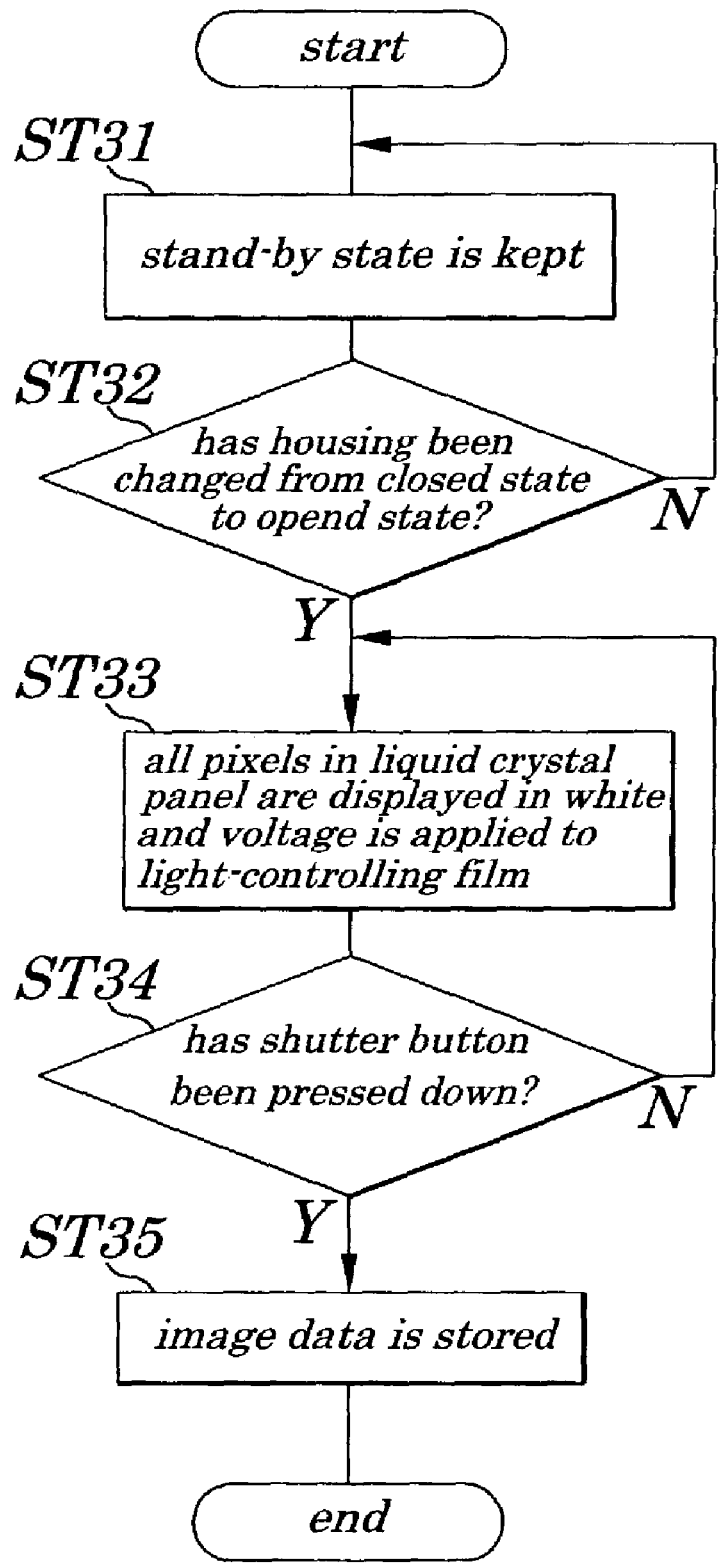
FIG. 16 is a flowchart explaining operations of the portable cellular phone of the third embodiment of the present invention.

FIG. 12 is a perspective view showing configurations of a folding portable cellular phone according to a third embodiment of the present invention. FIG. 13 is a perspective view showing configurations of the folding portable cellular phone according to the third embodiment. FIG. 14 is a schematic block diagram showing configurations of the folding portable cellular phone according to the third embodiment. FIG. 15 is a cross-sectional view schematically illustrating configurations of a main display section of the folding portable cellular phone according to the third embodiment. FIG. 16 is a flowchart explaining operations of the folding portable cellular phone of the third embodiment. Configurations of the folding portable cellular phone of the third embodiment differ from those in the first embodiment in that a lens window and a camera lens of an electronic still camera section are placed on a face serving as an inside portion when an upper housing of the folding portable cellular phone is folded and in that a main display section is made up of a liquid crystal display device that can be used as a mirror if necessary and a flip sensor adapted to check whether or not the housing is opened is provided so that the main display section can be used as a mirror when a housing that had been closed is opened. As a result, an auxiliary display section is used only for normal display and is not used as a mirror. Configurations other than described above are approximately same as those in the first embodiment and their descriptions are simplified.

A foldable portable cellular phone 1A of the third embodiment, as shown in FIG. 12 to FIG. 14, is provided with a foldable housing 41, a control section 42, a storing section 43, an electronic still camera section 44, an antenna 45, a wireless communication section 46, an operating section 47, a main display section (also serving as a mirror for determining photographic composition of a subject to be photographed, display device, and first display unit) 48 made up of a reflecting-type liquid crystal display which is placed on a side serving as an inside while the foldable housing 41 is being folded and is used as a mirror if necessary and is also used for determining photographic composition of a subject to be photographed when, for example, an operator takes a photograph of himself/herself, an auxiliary display section (also serving as a second display unit) 49 made up of, for example, a transmitting-type liquid crystal display device which is placed on a side serving as an outside while the foldable housing 41 is being folded, a flip sensor (opening and closing detecting unit) 51 used to check whether the foldable housing 41 is opened or not, a loudspeaker 52, a microphone 53, and a power source section 54.

The main display section 48, as shown in FIG. 15, has a liquid crystal panel 55, a front light (surface illuminating device) 56 placed on a front of the liquid crystal panel 55, a light-controlling film (light-controlling layer) 57 placed on a back side of the liquid crystal panel 55, light transmittance of which is controlled according to an applied voltage, and a specular reflecting plate 58 placed on a rear of the light-controlling film 57. In the main display section 48, mainly at a time of being photographed, all pixels in the liquid crystal panel 55 are put in a light-transmitting state (to be displayed in white) and the light-controlling film 57 is put in a transmitting state and, as a result, an entire main display section 48 is used as a mirror and, mainly at a time of not being photographed, the light-controlling film 57 is put in a light-intercepting state and a character or an image is displayed. The flip sensor 51 checks if the foldable housing 41 is opened or not and, based on a result from this check, the control section 42 has the main display section 48 serve as a mirror when the foldable housing 41 is changed from its closing state to its opening state and controls so as to put the main display section 48 into a photographing stand-by state.

Next, operations of the foldable portable cellular phone 1A of the third embodiment are described by referring to FIG. 16. In a state where the foldable housing 41 is closed, the flip sensor 51 sends a closing state detecting signal to the control section 42 and the control section 42, based on the closing state detected signal, keeps the photographic stand-by mode (Step ST31, see FIG. 16). When the foldable housing 41 is changed from a closed state to an opened state (Step ST32), the flip sensor 51 sends an opening state detecting signal to the control section 42 which, based on the opening state detected signal, is changed to a photographing mode and controls the liquid crystal panel 55 so that its all pixels are put in a light-transmitting state (to be displayed in white) and, at a same time, applies a predetermined voltage to the light-controlling film 57 to put it into a transparent state (Step ST33) and to get light reflected off the specular reflecting plate 58 viewed visually by an operator. That is, the main display section 48 is used as a mirror so that an image of a-subject to be photographed may be looked.

In this state, the operator, if wishing to take a photograph of himself/herself, directs a camera lens 22 to himself/herself and holds the foldable portable cellular phone 1A at the ready and, at a same time, corrects a posture of the foldable portable cellular phone 1A so that his/her face may be looked in the main display section 48 in a manner that has a desired size or a position. Thus, after the operator has determined photographic composition of a subject to be photographed and confirmed an area in which photographing is performed, the operator presses down a shutter button 25 (Step ST34). The control section 42, after having received image data obtained by photographing from an image processing section 24, stores the received image data into the storing section 43 (Step ST35) and stops application of a voltage to the light-controlling film 57 to put it into a light-intercepting state and to scatter incident light and, based on the image data, feeds a predetermined display signal to the main display section 48 to display an image. After that, the control section 42, by an operator's transmitting operation, sends image data obtained by photographing through the wireless communication section 46 to an other portable cellular phone, or a like designated by the operator.

According to configurations of the foldable portable cellular phone 1A of the third embodiment, almost the same effects obtained in the first embodiment can be achieved. Additionally, since a region being used as the mirror is relatively wide, an area for photographing and/or a position of a subject to be photographed can be more reliably confirmed and photographic composition of a subject to be photographed can be determined smoothly, a failure in photographing can be prevented. Moreover, since the light-controlling film 57 is put into a light-intercepting state to scatter externally-fed light, glare of display is reduced, thereby improving a quality of display. Moreover, since a lens window 21 and camera lens 22 are placed only on a face serving as an inside while an upper housing is being folded, design of the foldable portable cellular phone 1A can be simplified and its beauty can be improved. Moreover, since, when the housing is opened, the main display section 48 is used as the mirror and is put into the stand-by state, speedy photographing can be achieved. Furthermore, since the main display section 48 having a comparatively wider area can be used as the mirror, it is made possible to use the wider area for, for example, sufficiently making neat.

Fourth Embodiment

Figure 17:
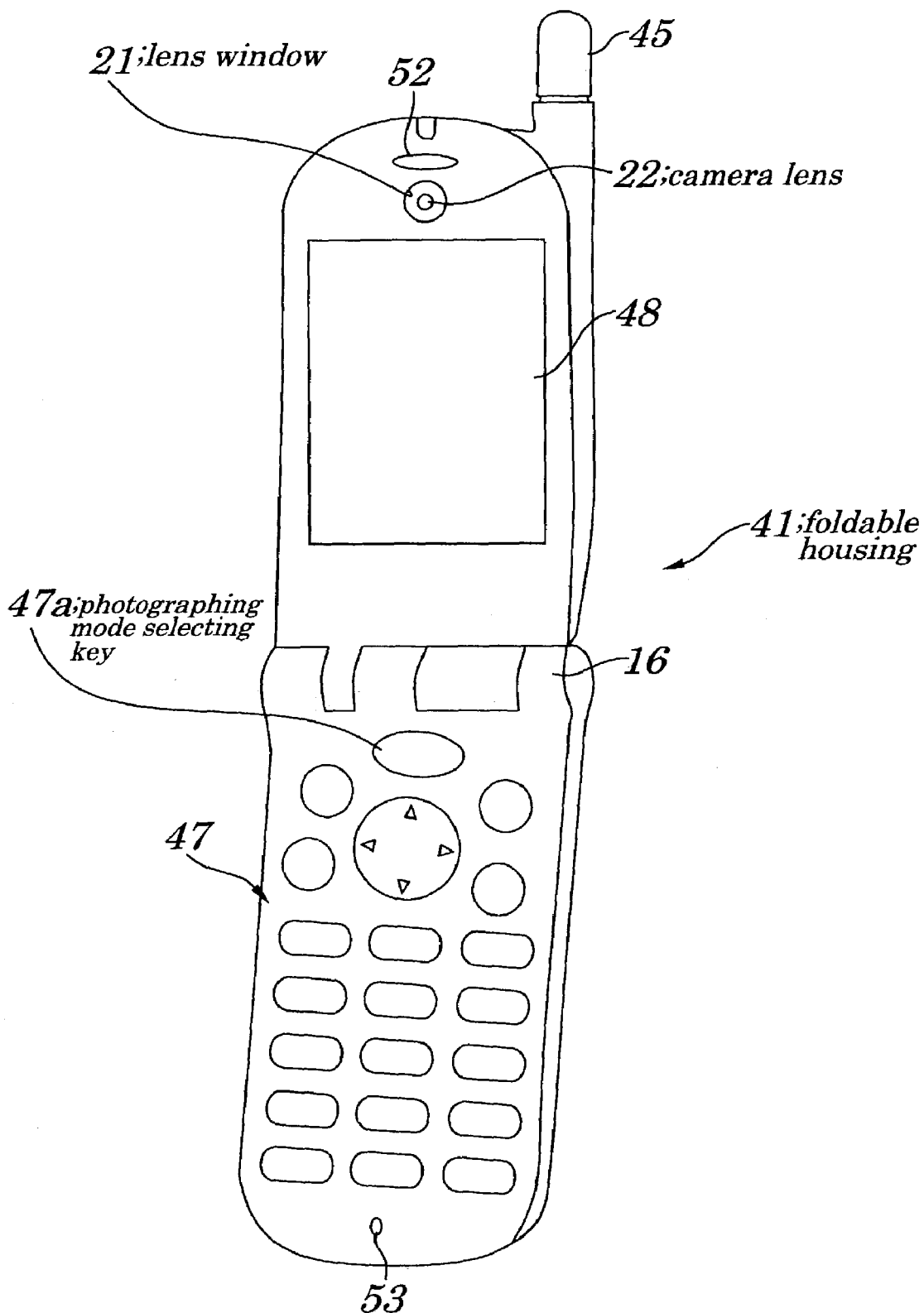
FIG. 17 is a perspective view showing configurations of a folding portable cellular phone according to a fourth embodiment of the present invention.
Figure 18:
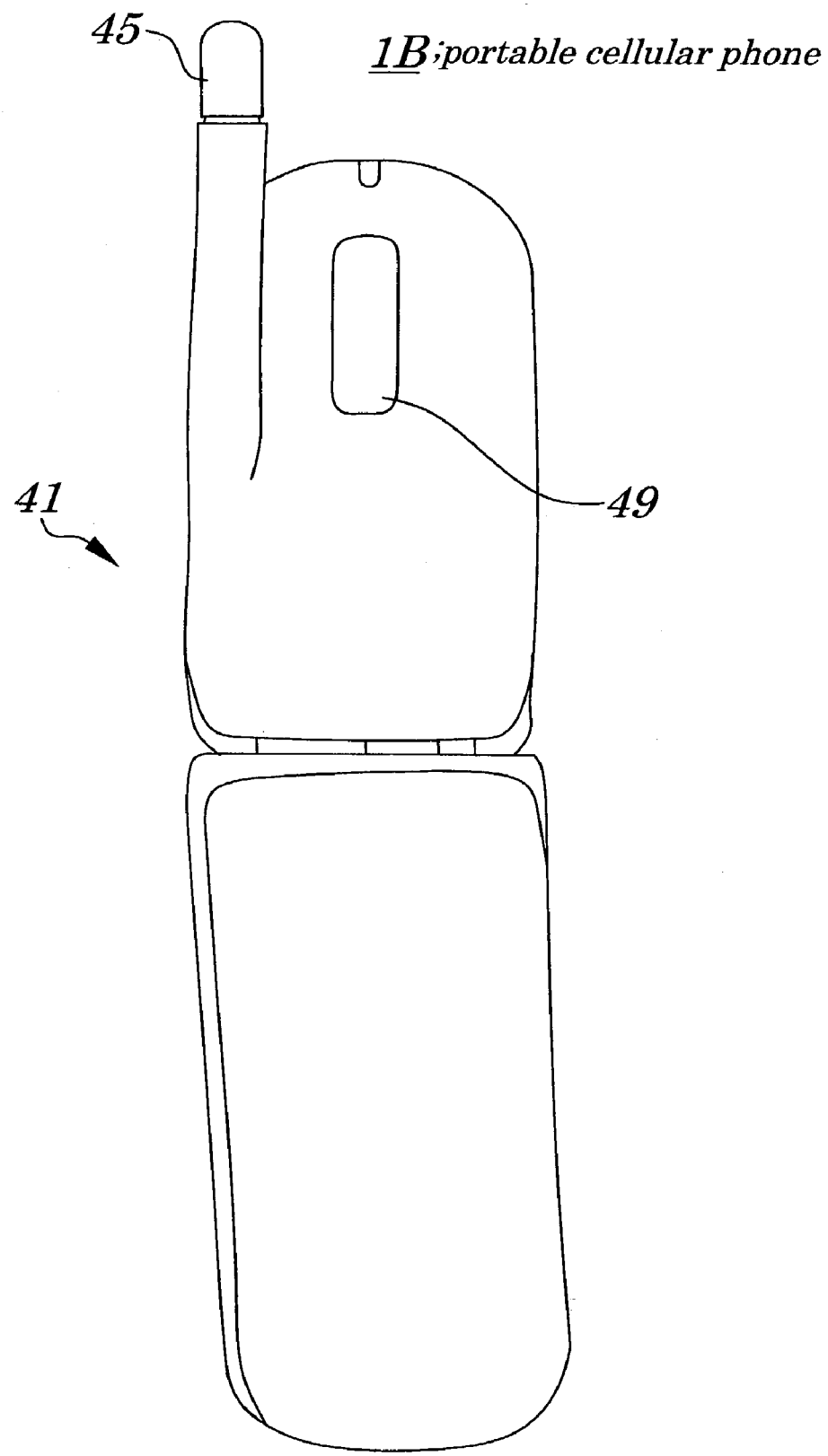
FIG. 18 is also a perspective view showing configurations of the folding portable cellular phone of the fourth embodiment of the present invention.
Figure 19:
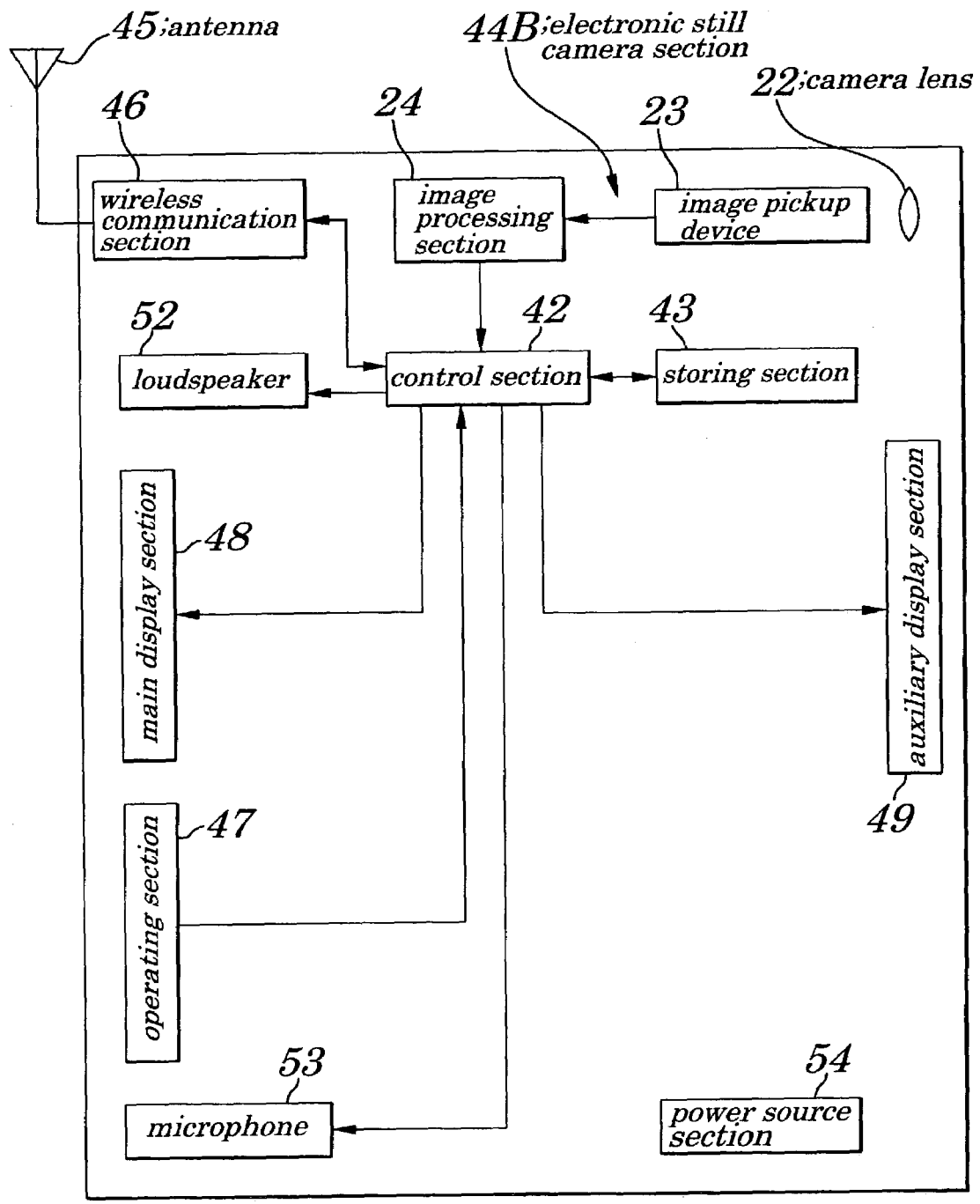
FIG. 19 is a schematic block diagram showing configurations of the folding portable cellular phone of the fourth embodiment of the present invention.

FIG. 17 is a perspective view showing configurations of a folding portable cellular phone according to a fourth embodiment of the present invention. FIG. 18 is also a perspective view showing configurations of the folding portable cellular phone of the fourth embodiment. FIG. 19 is a schematic block diagram showing configurations of the folding portable cellular phone of the fourth embodiment. Configurations of the folding portable cellular phone of the fourth embodiment differ greatly from those in the third embodiment in that a shutter button 25 employed in the third embodiment is not used and a photographing mode selecting key 47a is made to serve also as the shutter button 25. Moreover, a flip sensor 51 employed in the third embodiment is not used and the photographing mode selecting key 47a is used to select a photographing mode. Configurations other than described above are same as those in the third embodiment and their descriptions are simplified accordingly.

The portable cellular phone 1B of the fourth embodiment, as shown in FIG. 17 to FIG. 19, is provided with a foldable housing 41, a control section 42, a storing section 43, an electronic still camera section 44B, an antenna 45, a wireless communication section 46, an operating section 47, a main display section 48 made up of a reflecting-type liquid crystal display which is placed on a side serving as an inside while the foldable housing 41 is being folded and is used as a mirror if necessary and is also used for determining photographic composition of a subject to be photographed when, for example, an operator takes a photograph of himself/herself, an auxiliary display section 49 made up of, for example, a liquid crystal display device which is placed on a side serving as an outside while the foldable housing 41 is being folded, a loud speaker 52, a microphone 53, and a power source section 54.

The electronic still camera section 44B, as shown in FIG. 17 to FIG. 19, is made up of a lens window 21, a camera lens 22, an image pickup device 23, an image processing device 24 and a shutter button specifically designed and used in the third embodiment is not employed. The control section 47 has the photographing mode selecting key 47a which is used to select a photographing mode to have the electronic camera section 44B take a photograph and to serve also as the shutter button. In the embodiment, the control section 42 exerts control in such a manner that, when the photographing mode selecting key 47a is pressed down the first time, the main display section 48 is made to operate as the mirror and when it is pressed down the second time, photographing is completed.

According to configurations of the portable cellular phone 1B of the fourth embodiment, almost the same effects obtained in the third embodiment can be achieved. Additionally, in the fourth embodiment, since the shutter button is not used, it is possible to reduce component counts and to improve beauty of the portable cellular phone 1B.

Fifth Embodiment

Figure 20:
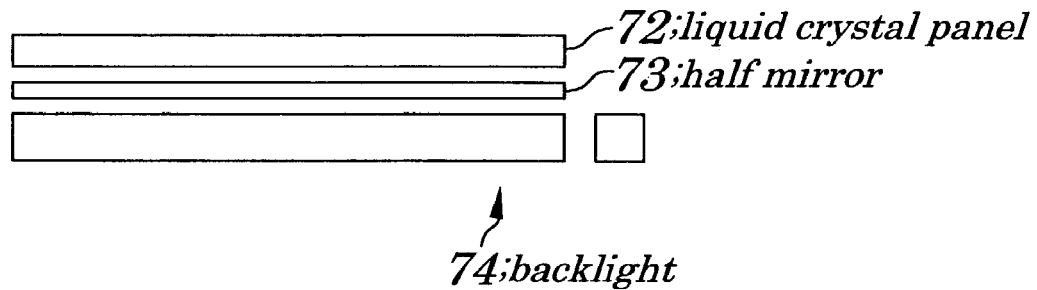
FIG. 20 is a cross-sectional view showing configurations of an auxiliary display section of a portable cellular phone according to a fifth embodiment of the present invention.

FIG. 20 is a cross-sectional view showing configurations of an auxiliary display section 71 of a portable cellular phone according to a fifth embodiment of the present invention. Configurations of the portable cellular phone of the fifth embodiment differ greatly from those in the first embodiment in that an auxiliary display section 71 is constructed of a transmitting-type liquid crystal display device. Configurations other than described above are the same as those in the first embodiment and their descriptions are simplified accordingly. The auxiliary display section 71 of the portable cellular phone of the fifth embodiment, as shown in FIG. 20, has a liquid crystal panel 72, a half mirror 73 placed on a rear of the liquid crystal panel 72, and a backlight 74 placed on a rear of the half mirror 73.

Next, operations of the portable cellular phone of the fifth embodiment are described below.

First, after power has been turned ON, a control section 3 is put into a stand-by mode in which a start of inputting operations by an operator and/or notification of arrival of data and/or messages or a like are waited for and gets a stand-by screen displayed on a main display section 9 and present time, notification of arrival of data and/or messages, or a like displayed on the auxiliary display section 71.

At this point, a part of illuminating light emitted from the backlight 74 passes through the half mirror 73 and is applied to the liquid crystal panel 72 and, at a same time, a part of externally-fed light having once passed through the liquid crystal panel 72 is also reflected off the half mirror 73 and is applied to the liquid crystal panel 72. The control section 3 feeds a display control signal to the auxiliary display section 71 to have it make an ordinary display.

In this state, when an operator presses down a photographing mode selecting key 8a to select a photographing mode, operations are changed to be in the photographing mode. This causes the control section 3 to exert control so that the liquid crystal panel 72 and its all pixels are put into a light-transmitting state (to be displayed in white) and the backlight 74 to go off. As a result, a part of the externally-fed light having once passed through the liquid crystal panel 72 is reflected off the half-mirror 73 and the reflected light is visually viewed by the operator. That is, the auxiliary display section 71 is used as the mirror and an image of a subject to be photographed is looked therein.

Moreover, the control section 3 has the main display section 9 display a subject to be photographed existing at a front of the camera lens 22 and the main display section 9 be currently put into a photographing stand-by state and display a message that photographing is possible by pressing down a shutter button 25.

The operator, if wishing to take a photograph of himself/herself, directs the camera lens 22 to himself/herself and holds the portable cellular phone at the ready and corrects a posture of the portable cellular phone so that his/her face may be looked in the auxiliary display section 71 in a manner that has a desired size or a position. After the operator has determined photographic composition of a subject to be photographed, the operator presses down the shutter button 25.

The control section 3, when having received image data obtained by photographing from the image processing section 24, stores it into the storing section 4 and, at a same time, displays the image on the main display section 9 based on the image data. After that, the control section 3, by an operator's sending operation, sends the image data obtained by photographing, through a wireless communication section 7, to an other portable cellular phone or a like designated by the operator.

According to configurations of the portable cellular phone of the fifth embodiment, almost the same effects obtained in the first embodiment can be achieved.

Sixth Embodiment

Figure 21:
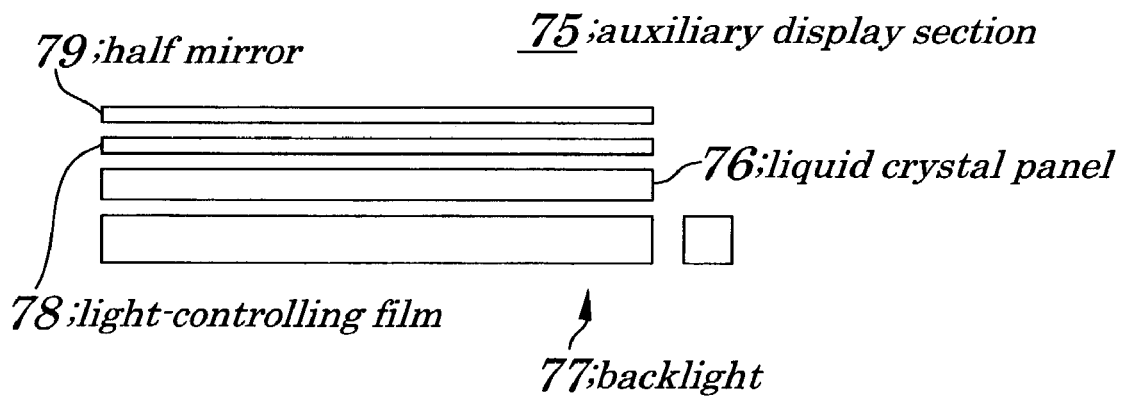
FIG. 21 is a cross-sectional view schematically showing configurations of an auxiliary display section of a portable cellular phone of a sixth embodiment of the present invention.

FIG. 21 is a cross-sectional view schematically showing configurations of an auxiliary display section of a portable cellular phone of a sixth embodiment of the present invention. Configurations of the portable cellular phone of the sixth embodiment differ from those in the fifth embodiment in that a light-controlling film is placed on a front of a liquid crystal panel and a half mirror is placed on a front of the light-controlling film. Configurations other than described above are same as those in the fifth embodiment and their descriptions are simplified accordingly.

The auxiliary display section 75 of the sixth embodiment, as shown in FIG. 21, is made up of a liquid crystal panel 76, a backlight 77 placed on a rear of the liquid panel 76, a light-controlling film 78 placed on a front of the liquid crystal panel 76, and a half mirror 79 placed on a front of the liquid crystal panel 76.

Next, operations of the portable cellular phone of the sixth embodiment are described. First, after power has been turned ON, a control section 3 is put in a stand-by mode in which a start of inputting operations by an operator and/or notification of arrival of data and/or messages or a like are waited for and, after having applied a predetermined voltage to the light-controlling film 78 to put it into a transparent state, also gets present time, notification of arrival of data and/or messages, or a like displayed on the auxiliary display section 75. At this point, illuminating light emitted by the backlight 77 is applied to the liquid crystal panel 76 and passes through the light-controlling film 78 and the half mirror 79 and is then viewed visually by the operator. Here, though a part of externally-fed light is reflected off the half mirror 79, intensity of the light is small compared with light emitted from the liquid crystal panel 76 and can be negligible.

In this state, when the operator presses down a photographing mode selecting key 8a and selects a photographing mode, operations are changed to be in the photographing mode. That is, the control section 3 stops a supply of a voltage to the light-controlling film 78 and puts it into a light-intercepting state. This causes the light fed from the liquid crystal panel 76 to be intercepted by the light-controlling film 78 and a part of externally-fed light is reflected off the half mirror 79 and the reflected light is visually viewed by the operator. That is, the auxiliary display section 75 is used as a mirror in which an image of a subject to be photographed is looked. Moreover, the control section 3 has a main display section 9 display a subject to be photographed existing at a front of a camera lens 22 and the main display section 9 be currently put into a photographing stand-by state and display a message that photographing is possible by pressing down a shutter button 25.

The operator, if wishing to take a photograph of himself/herself, directs the camera lens 22 to himself/herself and holds the portable cellular phone at the ready and corrects a posture of the portable cellular phone so that his/her face may be looked in a manner that has a desired size or a position. After the operator has determined photographic composition of a subject to be photographed and confirmed an area for photographing, the operator presses down the shutter button 25. The control section 3, when having received image data obtained from photographing from an image processing section 24, stores it into a storing section 4 and has the main display section 9 display an image based on the image data.

After that, by operator's sending operations, the control section 3 sends the image data obtained by photographing, through a wireless communication section 7, to an other portable cellular phone designated by the operator.

According to configurations of the portable cellular phone of the sixth embodiment, almost the same effects obtained in the fifth embodiment can be achieved.

It is apparent that the present invention is not limited to the above embodiments but may be changed and modified without departing from the scope and spirit of the invention. For example, in the above embodiments, as the example of the portable electronic device, the portable cellular phone is used. However, a PHS (Personal Handy-phone System), PDA (Personal Digital Assistance) having a function of wireless communications, or a like may be employed as well, which can provide same effects obtained by using the portable cellular phone. Moreover, it is not necessary that the portable electronic device has the function of wireless communications, and the portable electronic device having a function as a digital camera such as a wristwatch-type digital camera may be employed. Also, a notebook-type personal computer with a camera embedded or a like may be used. Furthermore, in the case of the portable cellular phone, it is not necessary that the portable cellular phone is of a folding type.

Figure 22:
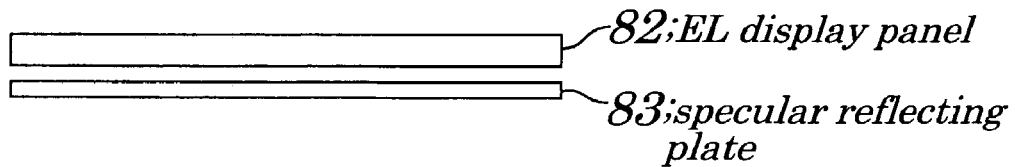
FIG. 22 is a cross-sectional view schematically showing configurations of an auxiliary display section of a portable cellular phone employed in a modified example of the first embodiment.

Also, in the above embodiments, as the display device employed in the main display section or in the auxiliary display section, the liquid crystal display is used, however, for example, an EL (Electroluminescent Display) device may be employed. Moreover, as the display device, a CRT (Cathode-Ray Tube) or a plasma display may be used. That is, as shown in FIG. 22, an auxiliary display section 81 to be employed in the above embodiments may be constructed in a manner that a specular reflecting plate 83 is placed on a side of a rear face of an EL display panel 82 made up of a plurality of transparent inorganic EL devices. The EL display panel 82, when having received a predetermined control signal from the control section, performs normal display and all regions of the EL display panel 82 are put in a transparent state when supply of a voltage to its all pixels has been stopped and then externally-fed light passes through the EL display panel 82 and is reflected off the specular reflecting plate 83 and reflected light can be visually viewed. In this case, the auxiliary display section 81 may be also constructed in a manner that light-controlling film is put between the EL display panel 82 and the specular reflecting plate 83 and a light-controlling film is so controlled as to be put into a transparent state only when the light-controlling film is used as a mirror. Thus, by using the EL display panel 82, component counts can be reduced, thereby achieving miniaturization and light-weight construction.

Also, in the above embodiments, when the main display section or the auxiliary display section is made to operate as the mirror, all regions of the display faces are used as the mirror, however, a part of the regions of the display faces may be configured so as to function as a mirror. At this point, an area, a position, a shape of a region of the display face to be used as a mirror may be designed that they can be changed whenever necessary. Moreover, in a region being not used as the mirror, a character, a pattern, or a like may be displayed. Furthermore, the main display section or the auxiliary display section may be used as the mirror except when it is used for photographing and/or making neat, that is, the mirror can be used for enjoying a predetermined pattern or animation.

In the above embodiment, a case where a still image obtained by photographing using the electronic still camera is sent is described. However, the portable cellular phone employed in the embodiments may be used as a television telephone. At this point, an upper half region of the main display section may be used as the mirror so that an operator himself/herself may be looked in the mirror, for example, to determine its photographic composition of a subject to be photographed and a lower half region of the main display section may be not used as the mirror but may be used to display an image of a subject to whom the operator is going to send the image obtained by photographing. Also, as the camera lens, not only the wide-angle lens but also the standard lens may be used. A plurality of camera lens configured so as to be selectable may be provided. An area or a position of a region of the main display section and auxiliary display section that can be used as the mirror may be varied depending on a type of the camera lens.

Moreover, in the first embodiment, the display section is put into the photographing stand-by state when a photographing mode selecting key 8a is pressed down after a housing 2 has been opened. In the third embodiment, the display section is put into the photographing stand-by state when the housing that had been closed is opened. A way to synchronize opening and closing operations of the housing with operations of the display section may be set in advance so that the way can be changed depending on a state using the portable cellular phone in each of operation modes. For example, an operator has a setting menu be displayed on the main display section and sets the above way to synchronize opening and closing operations of the housing with operations of the display section. Then, according to the setting, when the housing that had been closed is opened, the display section is made to operate so as not to be put into a photographing mode, but so as to be used only as a mirror or when the housing that had been closed is opened, the display section is made to put into a mailing mode.

Also, in the first embodiment, if the main display section or the auxiliary display section is operated not to function as the mirror, it is used to perform normal display. However, if neither of them is used as the mirror, it can be used without displaying anything. Moreover, a stroboscopic device may be provided.

Also, in each of the above embodiments, the configurations employed in the main display section may be used in the auxiliary display section and the configurations employed in the auxiliary display section may be used in the main display section. For example, in the third embodiment, the main display section is made up of the liquid crystal panel, front light, light-controlling film, and specular reflecting plate, however, the auxiliary display section may be constructed using the same components for the main display section.

Also, in the first embodiment, the portable cellular phone is so constructed that a photograph is taken at a same time when the shutter button 25 is pressed down, however, it may be constructed so that a self timer is provided so as to take a photograph after a predetermined period of time. At this point, the portable cellular phone may be configured so that, in the photographing mode, an arrival notification lamp flashes for the predetermined period of time. Moreover, in the first embodiment, a front light is used as the surface illuminating device of the liquid crystal panel, however, if externally-fed light having sufficient intensity can be obtained, only the externally-fed light can be employed.

Figure 23:
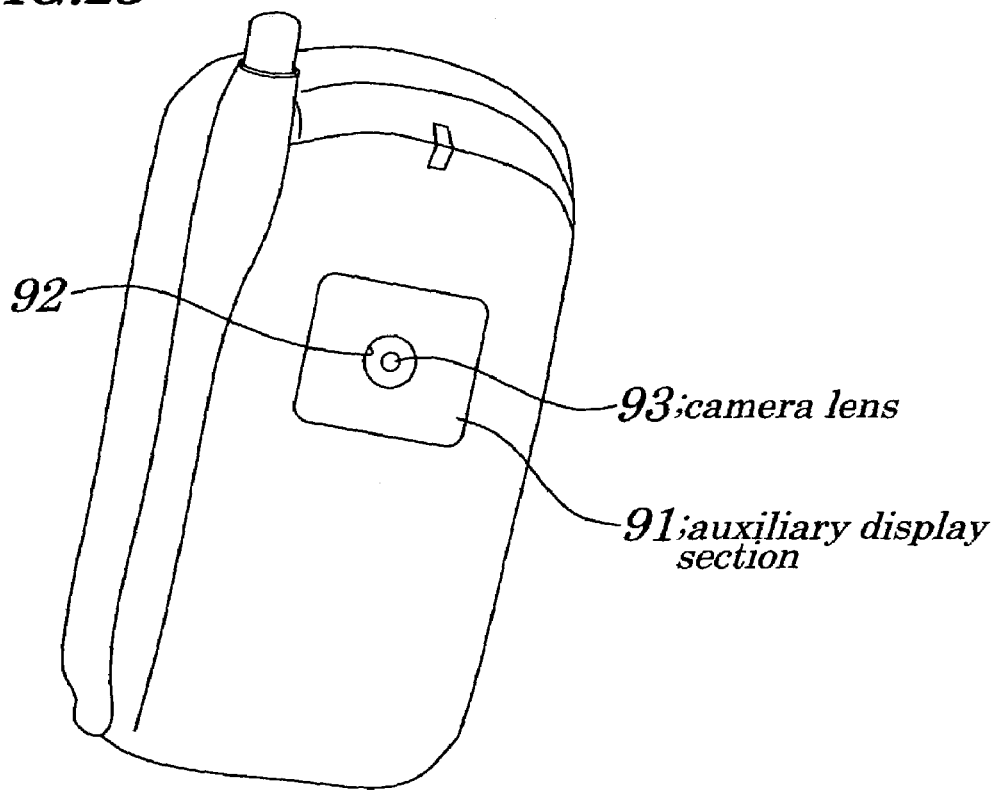
FIG. 23 is a perspective view showing configurations of a portable cellular phone employed in another modified example of the first embodiment.
Figure 24:
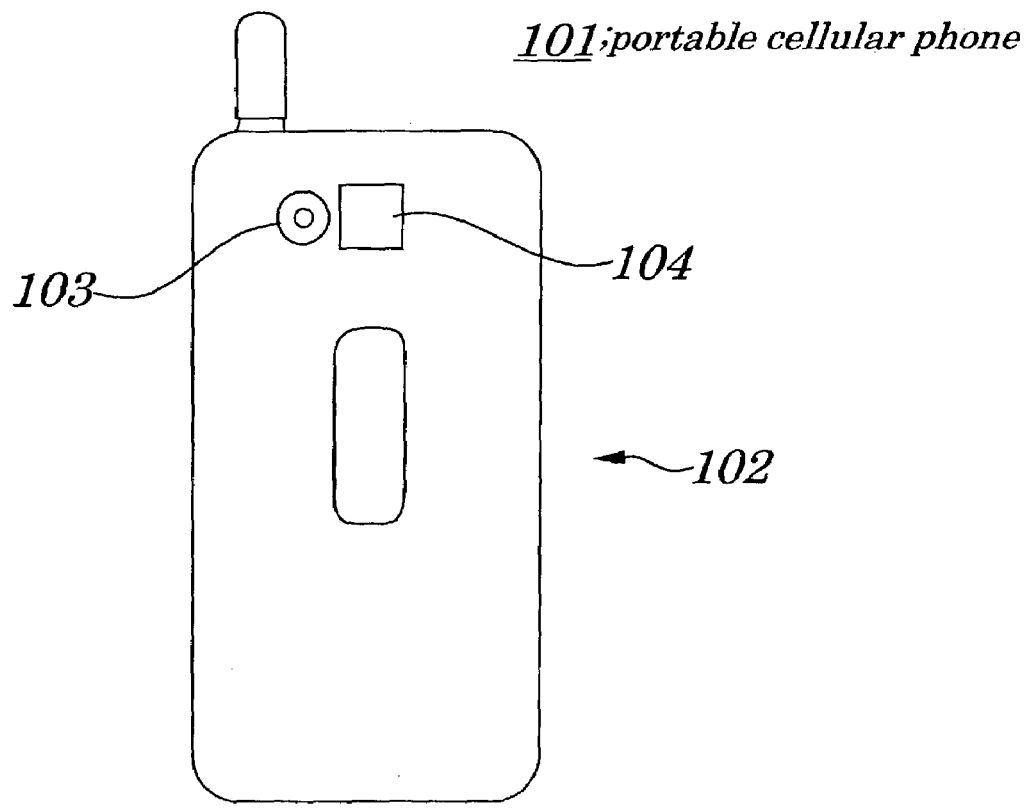
FIG. 24 is a diagram explaining a conventional technology.

Also, in the first embodiment, the auxiliary display device is placed below the lens window and the camera lens. However, as shown in FIG. 23, an auxiliary display section having a relatively large area is provided at a center of which a lens window 92 and a camera lens 93 may be placed. In the first embodiment, the case is described where the shutter button is placed at an upper end of the upper housing, however, the shutter button may be placed on a side end.

Also, in the second embodiment, the case is described where a mirror portion made up of the mirror reflecting plate and light-controlling film is placed on a rear (on a side serving as an outside when the housing is folded) of the housing, however, the mirror reflecting plate and the light-controlling film is placed on a side of the housing and, if necessary, they are used as the mirror.

Also, in the fifth embodiment, a light-controlling film may be placed between the liquid crystal panel and the half mirror. Also, in the sixth embodiment, when the auxiliary display section is used as the mirror, the backlight may be switched off.

Furthermore, the light-controlling film 78 may not be incorporated and, when light is emitted from a side of the liquid crystal panel 6, the half mirror 79 may be operated to function as the mirror.

It is apparent that the present invention is not limited to the above embodiments but may be changed and modified without departing from the scope and spirit of the invention.

What is claimed is:

1. A portable electronic device comprising:
   a camera to take a photograph of a subject to be photographed;
   a composition determining mirror to look therein at said subject to be photographed, hereby determining photographic composition of said subject to be photographed; and a selectable photography mode function,
   wherein said composition determining mirror is selectively kept in one of a specular state as a whole in response to a user selecting said photography mode function, and a non-specular state as a whole when said photography mode function is not selected, by an electro-optically controlled switching process.

2. The portable electronic device according to claim 1, wherein said composition determining mirror includes a mirror reflector so configured as to be electro-optically controlled alternatively in one of an appearing state and a hiding state as a whole.

3. The portable electronic device according to claim 2, wherein on a front of said mirror reflector is provided a light-controlling layer which is put one of into a transparent state in which incident light is allowed to pass by being controlled electro-optically and into a light-intercepting state in which the incident light is intercepted by being at least one of absorbed and scattered.

4. The portable electronic device according to claim 2, wherein on a front of said mirror reflector is provided a light-controlling layer, light transmittance of which is controlled in accordance with an applied voltage.

5. The portable electronic device according to claim 4, wherein said light-controlling layer is constructed so that micro-capsules in which liquid crystals are put hermetically are dispersed in base materials.

6. The portable electronic device according to claim 1, wherein said composition determining mirror is placed on a same side as a lens window on which incident light fed from said subject to be photographed is incident and is used when a photograph is taken of at least one of a photographer and a subject to be photographed existing behind said photographer.

7. The portable electronic device according to claim 2, further comprising:
   a display unit which is able to display characters and/or images and includes said mirror reflector and serves as said composition determining mirror as needed; and
   a control unit which controls said display unit to put one of a part of and all of regions of said mirror reflector into an appearance state mainly while a photograph is being taken.

8. The portable electronic device according to claim 7, wherein said display unit comprises said mirror reflector arranged on a rear of a liquid crystal panel including a plurality of pixels and wherein said control unit puts all of said display unit into a light-transmitting state and all of said mirror reflector into an appearance state at least one of before and while a photograph is being taken, and has said display unit display characters and/or images while the photograph is not being taken.

9. The portable electronic device according to claim 8, wherein a light-controlling layer is placed between said liquid crystal panel and said mirror reflector and wherein said control unit puts said light-controlling layer into a light transmitting state mainly while the photograph is being taken and said light-controlling layer into a light-intercepting state mainly while the photograph is not being taken.

10. The portable electronic device according to claim 8, wherein a surface illuminating device is placed on a front of said liquid crystal panel.

11. The portable electronic device according to claim 2, wherein said control unit puts one of a part of and all of regions of said mirror reflector into an appearance state so that, in said subject to be photographed, only a part of which a photographer desires to take a photograph may be determined by the photographer.

12. The portable electronic device according to claim 2, wherein said control unit sets a region of said mirror reflector which is put into an appearance state depending on types of camera lens.

13. The portable electronic device according to claim 1, comprising:
   a display unit being provided with a liquid crystal panel including a plurality of pixels being able to display characters and/or images, a semi-transparent mirror layer being placed on a rear of said liquid crystal panel, and a surface illuminating device being placed on a rear of said semi-transparent mirror layer, and serving also as said composition determining mirror; and
   a control unit to control said display unit so that said pixels in said display unit are put into a light transmitting state mainly while the photograph is being taken and so that characters and/or images are displayed mainly while the photograph is not being taken.

14. The portable electronic device according to claim 1, comprising:
   a display unit being provided with a liquid crystal panel including a plurality of pixels being able to display characters and/or images, a light-controlling layer being placed on a front of said liquid crystal panel, a semi-transparent mirror layer being placed on a front of said light-controlling layer, and a surface illuminating device being placed on a rear of said liquid crystal panel, and serving also as said composition determining mirror as needed; and
   a control unit to control said display unit so that, mainly while the photograph is being taken, said light-controlling layer is put into a light-intercepting state and so that, mainly while the photograph is not being taken, characters and/or images are displayed and said light-controlling layer is put into a light-transmitting state.

15. The portable electronic device according to claim 1, further comprising a foldable housing comprised of an upper housing and a lower housing, both being coupled to each other through a hinge portion.

16. The portable electronic device according to claim 15, further comprising a first display unit being placed on a side serving as an inside of said housing while said housing is being closed and a second display unit being placed on a side serving as an outside of said housing while said housing is being closed in a folded manner and wherein at least one of said first and second display units serves also as said composition determining mirror as needed.

17. The portable electronic device according to claim 7, wherein said display unit is placed in a region surrounding a lens window.

18. The portable electronic device according to claim 15, further comprising an opening and closing detecting device to check to see opening and closing states of said housing, wherein a control unit controls a display unit according to a detecting signal fed from said opening and closing detecting device.

19. The portable electronic device according to claim 18, wherein said control unit, at least when said housing is changed from its closed state to its opened state, puts said display unit into a specular state.

20. The portable electronic device according to claim 1, further including a function of providing for data communications.

21. A portable cellular phone providing for voice communications comprising:
- a camera to take a photograph of a subject to be photographed;
- a composition determining mirror to look therein at said subject to be photographed, hereby determining photographic composition of said subject to be photographed; and
- a selectable photography mode function,
- wherein said composition determining mirror is selectively kept in one of a specular state as a whole in response to a user selecting said photography mode function, and a non-specular state as a whole when said photography mode function is not selected, by an electro-optically controlled switching process.

22. The portable cellular phone according to claim 21, wherein said composition determining mirror includes a mirror reflector so configured as to be electro-optically controlled alternatively in one of an appearing state and a hiding state as a whole.

23. The portable cellular phone according to claim 22, wherein on a front of said mirror reflector is provided a light-controlling layer which is put on of into a transparent state in which incident light is allowed to pass by being controlled electro-optically and into a light-intercepting state in which the incident light is intercepted by being one of absorbed and scattered.

24. The portable cellular phone according to claim 22, wherein on a front of said mirror reflector is provided a light-controlling layer, light transmittance of which is controlled in accordance with an applied voltage.

25. The portable cellular phone according to claim 24, wherein said light-controlling layer is constructed so that micro-capsules in which liquid crystals are put hermetically are dispersed in base materials.

26. The portable cellular phone according to claim 21, wherein said composition determining mirror is placed on a same side as a lens window on which incident light fed from said subject to be photographed is incident and is used when a photograph is taken of one of a photographer and a subject to be photographed existing behind said photographer.

27. The portable cellular phone according to claim 22, further comprising a display unit which is able to display characters and/or images and includes said mirror reflector and serves as said composition determining mirror as needed and a control unit which controls said display unit to put one of a part of and all of regions of said mirror reflector into an appearance state mainly while a photograph is being taken.

28. The portable cellular phone according to claim 27, wherein said display unit comprises said mirror reflector arranged on a rear of a liquid crystal panel including a plurality of pixels and wherein said control unit puts all of said display unit into a light-transmitting state and all of said mirror reflector into an appearance state at least one of before and while a photograph is being taken, and has said display unit display characters and/or images while the photograph is not being taken.

29. The portable cellular phone according to claim 28, wherein a light-controlling layer is placed between said liquid crystal panel and said mirror reflector and wherein said control unit puts said light-controlling layer into a light transmitting state mainly while the photograph is being taken and said light-controlling layer into a light-intercepting state mainly while the photograph is not being taken.

* * * * *